US012659391B2

(12) United States Patent
Lee

(10) Patent No.: US 12,659,391 B2
(45) Date of Patent: Jun. 16, 2026

(54) PROTECTION PANEL AND DISPLAY APPARATUS INCLUDING THE SAME

(71) Applicant: SAMSUNG DISPLAY CO., LTD., Yongin-si (KR)

(72) Inventor: Kangyong Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 448 days.

(21) Appl. No.: 18/105,154

(22) Filed: Feb. 2, 2023

(65) Prior Publication Data

US 2023/0269318 A1 Aug. 24, 2023

(30) Foreign Application Priority Data

Feb. 24, 2022 (KR) ........................ 10-2022-0024568

(51) Int. Cl.
*H04M 1/02* (2006.01)
*G06F 3/044* (2006.01)

(52) U.S. Cl.
CPC ........ *H04M 1/0266* (2013.01); *G06F 3/0441* (2019.05); *G06F 2203/04101* (2013.01); *G06F 2203/04107* (2013.01)

(58) Field of Classification Search
CPC ........ H04M 1/0266; H04M 1/02; H04M 1/03; H04M 1/23; H04M 1/62; H04M 1/0269; H04M 1/0295; H04B 1/03; H04B 1/06; G06F 3/0441; G06F 2203/04101; G06F 2203/04107; G09F 9/30; G09F 9/301; H10K 50/84; H10K 77/111; H10K 2102/311
See application file for complete search history.

(56) References Cited

U.S. PATENT DOCUMENTS

| | | | |
|---|---|---|---|
| 10,283,736 B2 | 5/2019 | Bae et al. | |
| 10,852,892 B2 * | 12/2020 | Mori | G06F 3/0446 |
| 12,295,244 B2 * | 5/2025 | Kuon | H10K 71/00 |
| 2015/0151515 A1 * | 6/2015 | Skepton | B32B 7/06 |
| | | | 428/354 |
| 2015/0299520 A1 | 10/2015 | Mansei et al. | |
| 2020/0050047 A1 * | 2/2020 | Son | H04M 1/0264 |
| 2020/0176705 A1 | 6/2020 | Lee et al. | |
| 2020/0201105 A1 * | 6/2020 | Cheng | G02F 1/1333 |
| 2021/0109406 A1 * | 4/2021 | Chen | C09J 11/04 |
| 2021/0111230 A1 * | 4/2021 | Shin | H10K 59/40 |

(Continued)

FOREIGN PATENT DOCUMENTS

| | | |
|---|---|---|
| CN | 111276046 A | 6/2020 |
| JP | 2020152773 A | 9/2020 |

(Continued)

*Primary Examiner* — Andrew Wendell

(74) *Attorney, Agent, or Firm* — CANTOR COLBURN LLP

(57) ABSTRACT

A protection panel includes a first panel member, a film member, and a cover member. The first panel member includes a first panel member body portion, and a first adhesive portion on the first panel member body portion, the film member is on the first panel member, and the cover member is on the first adhesive portion. A portion of at least one selected from the first panel member body portion and the first adhesive portion of the first panel member includes a cutout portion which separates adjacent portions thereto from each other.

19 Claims, 19 Drawing Sheets

(56) References Cited

U.S. PATENT DOCUMENTS

| | | | |
|---|---|---|---|
| 2022/0181592 A1* | 6/2022 | Jeong ...................... | B32B 5/024 |
| 2022/0238820 A1* | 7/2022 | Wang ................... | H10K 77/111 |
| 2023/0040918 A1* | 2/2023 | Jiang ........................ | G02B 1/14 |
| 2024/0257670 A1* | 8/2024 | Kim ...................... | H04M 1/026 |

FOREIGN PATENT DOCUMENTS

| | | |
|---|---|---|
| KR | 1020150072400 A | 6/2015 |
| KR | 1020160110673 A | 9/2016 |
| KR | 1020200068139 A | 6/2020 |

* cited by examiner

PROTECTION PANEL AND DISPLAY APPARATUS INCLUDING THE SAME

This application claims priority to Korean Patent Application No. 10-2022-0024568, filed on Feb. 24, 2022, and all the benefits accruing therefrom under 35 U.S.C. § 119, the content of which in its entirety is herein incorporated by reference.

BACKGROUND

1. Field

One or more embodiments relate to devices, and more particularly, to a protection panel and a display apparatus including the protection panel.

2. Description of the Related Art

Electronic devices based on mobility are widely used in various fields. Recently, tablet personal computers (PCs), in addition to small-sized electronic devices, such as a mobile phone, have been widely used as mobile electronic devices.

Such mobile electronic devices typically include a display for providing a user with visual information, such as images or videos, to support various functions. Recently, as components for driving such displays have become miniaturized, the occupancy of the displays in electronic devices is gradually increasing. Moreover, a structure that may be curved to have a predetermined angle from a flat state has been developed.

SUMMARY

One or more embodiments include a protection panel and a display apparatus including the protection panel.

According to one or more embodiments, a protection panel includes a first panel member, a film member, and a cover member. In such embodiments, the first panel member includes a first panel member body portion, and a first adhesive portion on the first panel member body portion, the film member is on the first panel member, and the the occupancy of the displays in electronic devices is gradually increasing. Moreover, a structure that may be curved to have a predetermined angle from a flat state has been developed.

SUMMARY

One or more embodiments include a protection panel and a display apparatus including the protection panel.

According to one or more embodiments, a protection panel includes a first panel member, a film member, and a cover member. In such embodiments, the first panel member includes a first panel member body portion, and a first adhesive portion on the first panel member body portion, the film member is on the first panel member, and the cover member is on the first adhesive portion. In such embodiment, a portion of at least one selected from the first panel member body portion and the first adhesive portion of the first panel member includes a cutout portion which allows adjacent portions thereto to be separated from each other.

In an embodiment, the cutout portion may be provided in plurality, and the plurality of cutout portions may be arranged apart from each other.

In an embodiment, the protection panel may further include a bridge portion arranged between adjacent cutout portions from among the plurality of cutout portions, where the bridge portion may connect a first region and a second region of the first panel member which are adjacent to each other with the adjacent cutout portions therebetween.

In an embodiment, the protection panel may further include a second panel member including a second adhesive portion on the first panel member body portion, and a second panel member body portion on the second adhesive portion.

In an embodiment, the cutout portion may be defined in the second adhesive portion.

In an embodiment, the cutout portion may be defined in a portion of the second panel member body portion.

In an embodiment, an adhesive force of the second adhesive portion may be greater than an adhesive force of the first adhesive portion.

In an embodiment, the adhesive force of the second adhesive portion may be 50 times or more the adhesive force of the first adhesive portion.

In an embodiment, the cover member may include a cover layer including metal, a cushion layer on the cover layer, and an uneven layer on the cushion layer.

According to one or more embodiments, a display apparatus includes a first panel member including a first panel member body portion, and a first adhesive portion on the first panel member body portion, a film member on the first panel member, a cover member on the first adhesive portion, and a display panel on the cover member. In such embodiments, at least one selected from the first panel member body portion and the first adhesive portion of the first panel member includes a cutout portion which allows adjacent portions thereto to be separated from each other.

In an embodiment, the cutout portion may be provided in plurality, and the plurality of cutout portions may be arranged apart from each other.

In an embodiment, the display apparatus may further include a bridge portion arranged between adjacent cutout portions from among the plurality of cutout portions, where the bridge portion may connect a first region and a second region of the first panel member which are adjacent to each other with the adjacent cutout portions therebetween.

In an embodiment, areas of at least one selected from the first adhesive portion and the first panel member body portion which are adjacent to each other with the cutout portion therebetween may be connected to each other to form a step structure.

In an embodiment, the display apparatus may further include a second panel member including a second adhesive portion on the first panel member body portion, and a second panel member body portion on the second adhesive portion.

In an embodiment, the cutout portion may be defined in the second adhesive portion.

In an embodiment, the cutout portion may be defined in the second panel member body portion.

In an embodiment, an adhesive force of the second adhesive portion may be greater than an adhesive force of the first adhesive portion.

In an embodiment, the adhesive force of the second adhesive portion may be 50 times or more the adhesive force of the first adhesive portion.

In an embodiment, areas of at least one selected from the first panel member and the second panel member which are adjacent to each other with the cutout portion therebetween may be connected to each other to form a step structure.

In an embodiment, areas of the first adhesive portion which are adjacent to each other with the cutout portion therebetween may contact the cover member.

BRIEF DESCRIPTION OF THE DRAWINGS

The above and other features of certain embodiments of the disclosure will be more apparent from the following description taken in conjunction with the accompanying drawings, in which.

DETAILED DESCRIPTION

Figure 1:
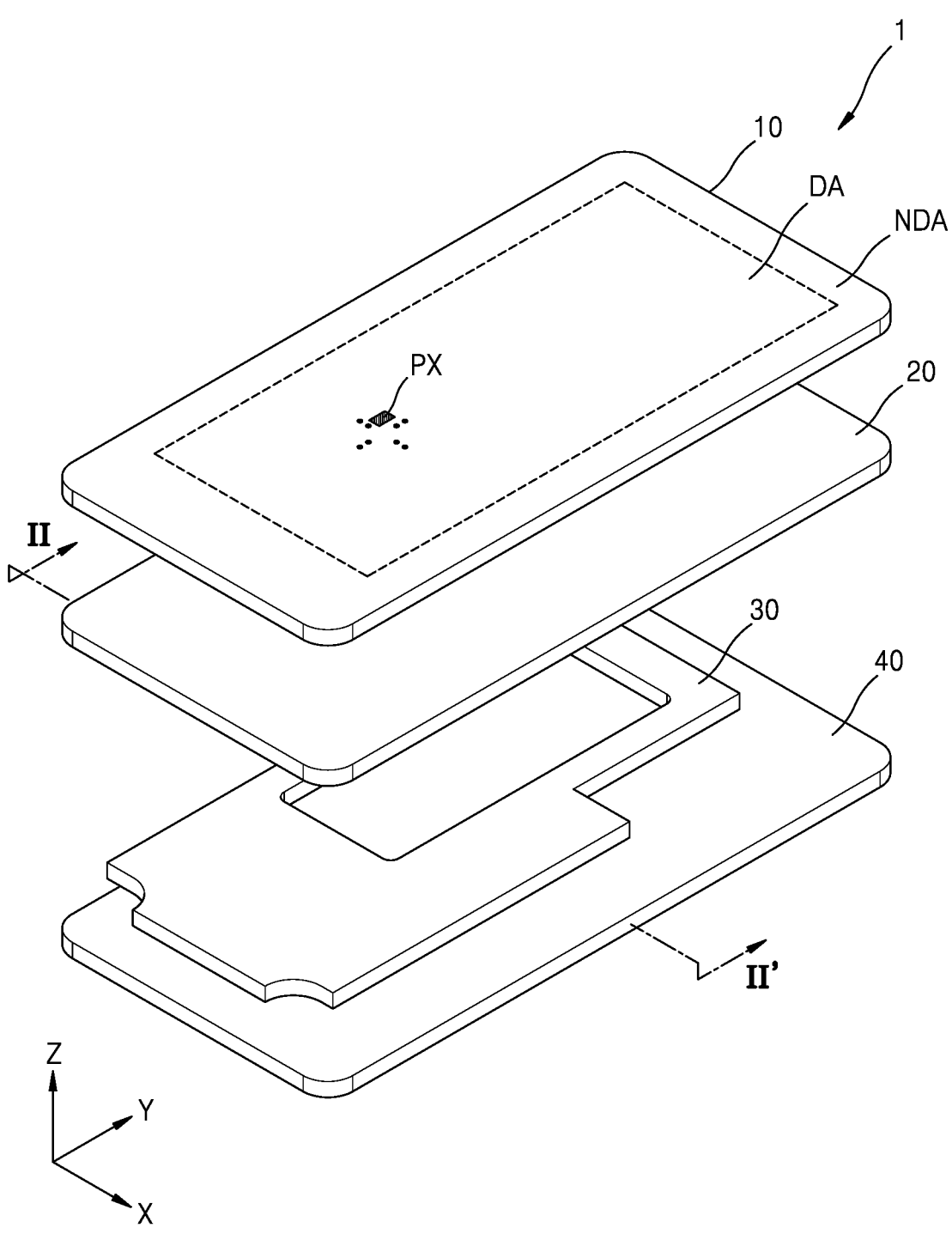
FIG. 1 is a schematic exploded perspective view of a display apparatus according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. Throughout the disclosure, the expression "at least one of a, b or c" or "at least one selected from a, b and c" indicates only a, only b, only c, both a and b, both a and c, both b and c, all of a, b, and c, or variations thereof.

As the disclosure allows for various changes and numerous embodiments, particular embodiments will be illustrated in the drawings and described in detail in the written description. Hereinafter, features of embodiments of the disclosure and a method for accomplishing them will be described more fully with reference to the accompanying drawings, in which embodiments of the disclosure are shown. The disclosure may, however, be embodied in many different forms and should not be construed as limited to the embodiments set forth herein.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "on" another element, it can be directly on the other element or intervening elements may be present therebetween. In contrast, when an element is referred to as being "directly on" another element, there are no intervening elements present.

Sizes of elements in the drawings may be exaggerated for convenience of explanation. For example, since sizes and thicknesses of components in the drawings are arbitrarily illustrated for convenience of explanation, embodiments of the disclosure are not limited thereto.

In the following examples, the X-axis, the Y-axis and the Z-axis are not limited to three axes of the rectangular coordinate system, and may be interpreted in a broader sense. For example, the X-axis, the Y-axis, and the Z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below, "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 2:
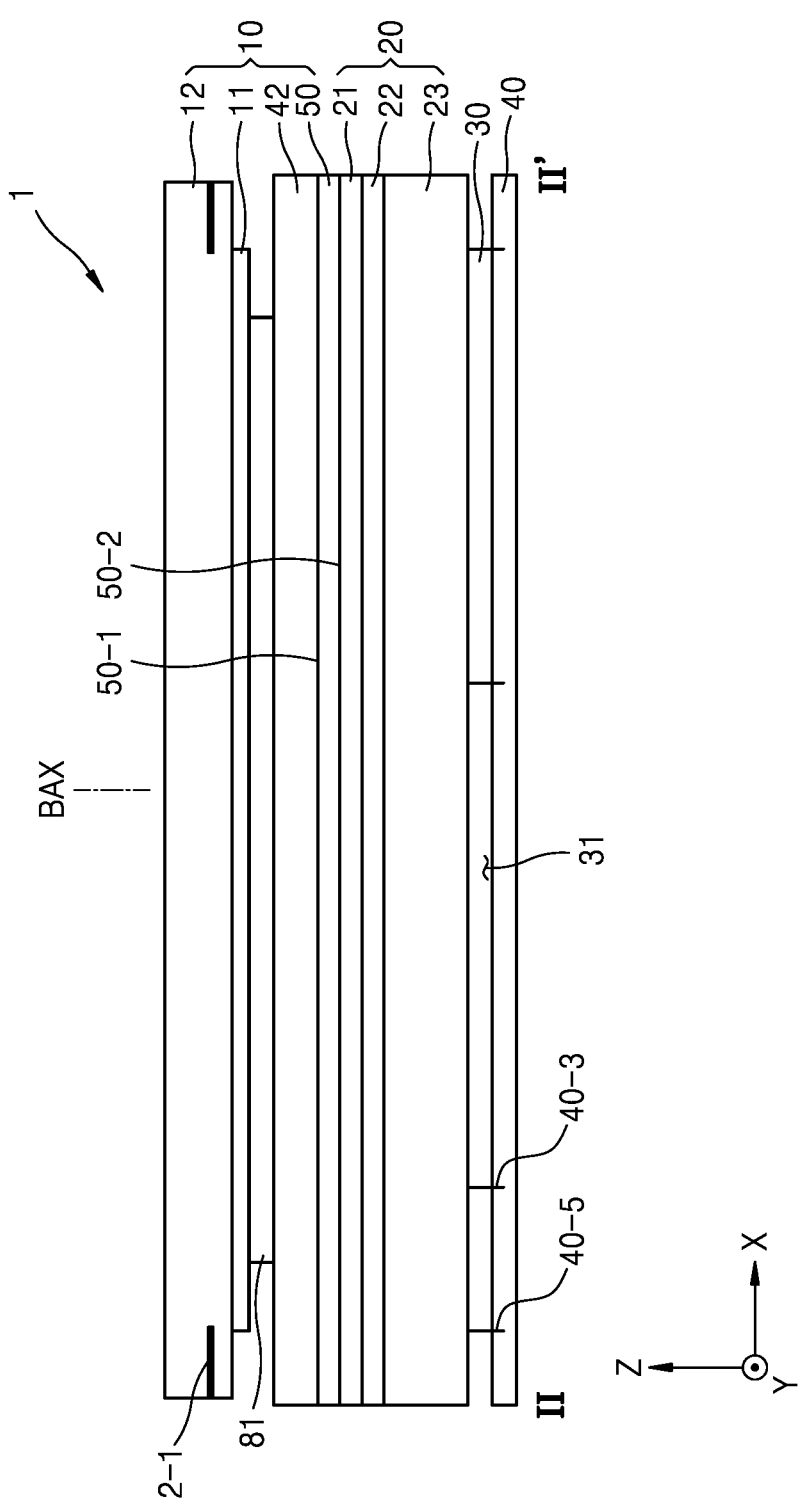
FIG. 2 is a cross-sectional view of the display apparatus taken along line II-II' of FIG. 1.

FIG. 1 is a schematic exploded perspective view of a display apparatus according to an embodiment. FIG. 2 is a cross-sectional view of the display apparatus taken along line II-II' of FIG. 1.

Referring to FIGS. 1 and 2, an embodiment of a display apparatus 1 may include a display panel unit 10 and a protection panel. The display panel unit 10 may include a cover window 11, a protection member 12, an optical functional layer 42, and a display panel 50. The protection panel may include a cover member 20 attached to the display panel 50, a film member 30, and a panel member 40.

The cover window 11 may include or be formed of a transparent material. In an embodiment, the cover window 11 may include glass, a transparent synthetic resin, or the like. The cover window 11 may include or be defined by one or more layers, that is, may have a single layer structure or a multilayer structure. The protection member 12 may be disposed on an upper surface of the cover window 11 to prevent application of a force to the cover window 11 or scratching the cover window 11. An opaque layer 12-1 may be arranged in a portion of the protection member 12. In an embodiment, the opaque layer 12-1 may be arranged in an edge region of the protection member 12. The opaque layer 12-1 may block light, and may include a light block layer, as described below.

The display panel 50 may be disposed under the cover window 11. The display panel 50 may include a first surface 50-1, in which a display region is arranged, and a second surface 50-2 corresponding to a surface opposite to the display region. The first surface 50-1 may provide an image, and the second surface 50-2 may provide no images. According to an alternative embodiment, almost the majority (for example, an area of about 50% or more of the area of the first surface 50-1) of the first surface 50-1 may provide an image, and only a portion of the second surface 50-2 may provide an image. However, for convenience of description, embodiments where only the first surface 50-1 provides an image will now be focused on and described in detail.

The display panel unit 10 may include a display area DA and a peripheral area NDA. The display area DA may refer to an area where an image is displayed, and the peripheral area NDA may refer to an area where no images are displayed. The display panel 50 may include a display area and a peripheral area respectively corresponding to the display area DA and the peripheral area NDA of the display panel unit 10.

FIG. 1 illustrates an embodiment of the display panel unit 10 in which the display area DA is rectangular. in an alternative embodiment, the display area DA may have a shape of a circle, an oval, or a polygon, such as a triangle or a pentagon. FIG. 1 also illustrates an embodiment of the display panel unit 10 having a flat shape, but the display panel unit 10 may be implemented in various other types, such as a flexible display panel unit, a foldable display panel unit, and a rollable display panel unit.

A plurality of pixels PX may be arranged in the display area DA. The plurality of pixels PX refer to subpixels that emit light beams of different colors, respectively, and each of the plurality of pixels PX may include, for example, a red subpixel, a green subpixel, or a blue subpixel.

The display panel 50 may be a light-emitting display panel including light-emitting elements. In an embodiment, for example, the display panel 50 may be an organic light-emitting display panel using an organic light-emitting diode including an organic emission layer, a micro light-emitting diode (LED) display panel using a micro LED, a quantum dot light-emitting display panel using a quantum dot LED including a quantum dot emission layer, or an inorganic light-emitting display panel using an inorganic light-emitting element including an inorganic semiconductor. For convenience of description, embodiments where the display panel 50 is an organic light-emitting display device will now be focused on and described in detail.

The optical functional layer 42 may be arranged on a touchscreen layer of the display panel 50. The optical functional layer 42 may include an anti-reflection layer. The anti-reflection layer may reduce the reflectivity of light (external light) that is incident from an external source toward the display apparatus 1.

According to some embodiments, the anti-reflection layer may include a polarization film. The polarization film may include a linear planarization plate and a phase delay film, such as a quarter-wave (λ/4) plate. The phase delay film may be on the touch screen layer, and the linear planarization plate may be on the phase delay film.

According to some embodiments, the anti-reflection layer may include a filter layer including a black matrix and color filters. The color filters may be arranged by taking into account the colors of light beams emitted by the pixels of the display apparatus 1. In an embodiment, for example, the filter layer may include a red, green, or blue color filter.

According to some embodiments, the anti-reflection layer may include a destructive interference structure. The destructive interference structure may include a first reflection layer and a second reflection layer arranged on different layers. First reflected light and second reflected light respectively reflected by the first reflective layer and the second reflective layer may destructively interfere with each other, and thus, the reflectance of external light may be reduced.

The cover window 11 may be disposed on the optical functional layer 42. The cover window 11 may be attached onto the optical functional layer 42 by a first adhesive layer

81, which is a transparent adhesive member, such as an optically clear adhesive (OCA) film.

In an embodiment, the protection panel may be disposed below the display panel 50. In such an embodiment, the protection panel may include the cover member 20, the film member 30, and the panel member 40. In such an embodiment, the cover member 20 may include an uneven layer 21 disposed below the display panel 50, a cushion layer 22 disposed on the uneven layer 21, and a cover layer 23 disposed on the cushion layer 22. In an embodiment, the cover layer 23 may include or be defined by a sheet of a single metal, such as copper.

The uneven layer 21 may be a pressure sensitive adhesive (PSA). A surface of the uneven layer 21 may have am embossing shape. In an embodiment, for example, a surface of the uneven layer 21 that contacts one surface of the display panel 50 may have an uneven shape although not shown in the drawings. The cushion layer 22 may absorb an externally applied impact. The cover layer 23 may include a metal sheet. In an embodiment, for example, the cover layer 23 may include copper.

According to an alternative embodiment, the cover member 20 may include an uneven layer 21, a cushion layer 22, and a cover layer 23, and the cover layer 23 may include a film layer (not shown), a heat dissipation layer (not shown), and a metal layer (not shown). The uneven layer 21 and the cushion layer 22 are the same as or similar to those described above, and thus, any repetitive detailed description thereof will be omitted herein.

The film layer may include polyimide. The film layer may absorb light incident from an external source.

The film layer stops or blocks transmission of light to prevent the components, for example, a display circuit board, arranged below a light absorption member, from being visible from above the display panel 50. The film layer may include a light-absorbing material, such as a black pigment or a black dye, arranged within a polyimide resin.

The heat dissipation layer may be disposed below the film layer. The heat dissipation layer may transmit heat generated by the display panel 50 to the outside. In such an embodiment, the heat dissipation layer may include a metal having high heat transfer efficiency.

In an embodiment, a digitizer (not shown) may be disposed under the display panel 50. In such an embodiment, because the digitizer includes a pattern layer, such that a signal input from an external electronic pen or the like may be sensed. In an embodiment, the digitizer may sense the intensity, direction, and the like of a signal input by an electronic pen or the like. The digitizer may be electrically connected to a main circuit board.

In an embodiment where the digitizer is disposed on the display panel 50, a bracket (not denoted) for supporting the display panel 50 may be disposed under the digitizer. The bracket may include plastic, metal, or both plastic and metal.

In an embodiment where the bracket is provided, the heat dissipation layer may be disposed on the bracket. In such an embodiment, the heat dissipation layer may be coupled to the bracket or may be integrally formed with the bracket as a single unitary and indivisible part.

In an embodiment, the metal layer may be disposed under the heat dissipation layer. In such an embodiment, the metal layer may be in the form of a plate including or formed of a metal, such as copper.

In an embodiment, the film member 30 may be disposed under the cover layer 23. In such an embodiment, an opening region 31 may be defined or arranged in the film member 30.

The opening region 31 may form a passage through which heat transferred from the cover layer 23 moves to the outside.

In an embodiment, the panel member 40 may be arranged on a rear surface of the film member 30. In such an embodiment, the panel member 40 may completely block the rear surface of the film member 30. In an embodiment, for example, the entire area of a planar shape of the film member 30 may be less than the size of a planar shape of the panel member 40. The panel member 40 may include a panel member body portion and an adhesive portion stacked on each other.

One or more panel members 40 may be provided. In an embodiment, for example, the panel member 40 may include a single first panel member. According to an alternative embodiment, the panel member 40 may include a first panel member and a second panel member. For convenience of description, embodiments where the panel member 40 includes a first panel member will now be focused on and described in detail.

The display apparatus 1 may include an adhesive layer (not denoted) although not shown in the drawings. In an embodiment, for example, the first adhesive layer 81 may be between the cover window 11 and the optical functional layer 42. A second adhesive layer (not shown) may be between the panel member 40 and the cover member 20.

In an embodiment of a method of manufacturing the display apparatus 1, the display panel 50 and the protection panel may be manufactured and prepared, and then, the protection panel may be attached onto the display panel 50. The protection panel may be in a state where the cover member 20, the film member 30, and the panel member 40 are sequentially attached to one another. The panel member 40 may be manufactured by forming a cutout portion 40-3 and an edge cutout portion 40-5 in at least one of a panel member body unit and an adhesive portion when the panel member body unit and the adhesive portion are stacked.

In such an embodiment, at least one selected from the cover window 11, the protection member 12, and the optical functional layer 42 may be attached to the display panel 50 before the display panel 50 is attached to the protection panel. According to an alternative embodiment, at least one selected from the cover window 11, the protection member 12, and the optical functional layer 42 may be attached to the protection panel together with the display panel 50 when at least one selected from the cover window 11, the protection member 12, and the optical functional layer 42 is attached to the display panel 50. In a process where the display panel 50 is attached to the protection panel, the display panel 50 may be attached to the protection panel by pressing one surface of the display panel 50 by using a roller or the like. In such a process, one surface of the protection panel may be bent according to, for example, the exterior of the cover member 20 stacked on the protection panel and whether the film member 30 is arranged, and thus, coupling between the display panel 50 and the protection panel may be partially not robust.

In an embodiment of the invention, the panel member 40 includes at least one selected from the cutout portion 40-3 and the edge cutout portion 40-5 as described above, deformation of the panel member 40 may be induced during the coupling between the display panel 50 and the protection panel, and thus, the coupling between the protection panel and the display panel 50 may be uniform over the entire surface of the display panel 50. In such an embodiment, insertion of bubbles between the display panel 50 and the protection panel during the coupling between the protection panel and the display panel 50 may be effectively prevented.

Figure 3A:
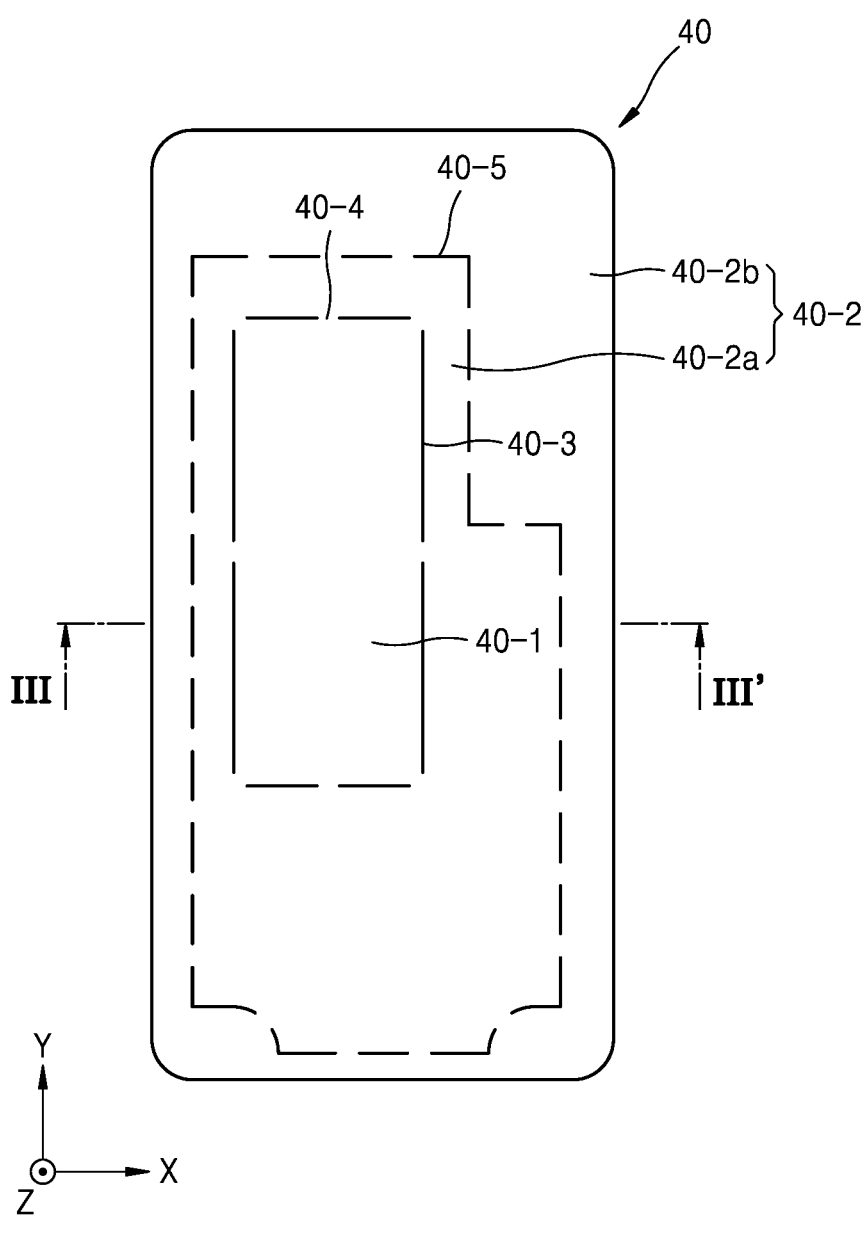
FIG. 3A is a schematic plan view of a panel member of a protection panel according to an embodiment.

FIG. 3A is a schematic plan view of a panel member of a protection panel according to an embodiment.

Referring to FIG. 3A, an embodiment of the panel member 40 may include a first panel member 40*a*. (see FIGS. 3B through 3D) The first panel member 40*a* may include a first panel member body portion 41*a* and a first adhesive portion 42*a*. (see FIGS. 3B through 3D) The first panel member body portion 41*a* and the first adhesive portion 42*a* may be stacked on each other. The cutout portion 40-3 may be defined or formed in the first panel member 40*a*. The cutout portion 40-3 may be formed in a thickness direction of the first panel member 40*a*. In an embodiment, for example, the cutout portion 40-3 may be formed in a portion of the first panel member 40*a* (see FIGS. 3B through 3D).

In an embodiment, as shown in FIG. 3A, a plurality of cutout portions 40-3 may be provided in a top view. In an embodiment, where the plurality of cutout portions 40-3 are connected to one another, a closed-loop may be formed. In such an embodiment, the closed loop formed by connecting the plurality of cutout portions 40-3 to one another may be the same as or similar to the shape of an opening region 31 of the film member 30. In such an embodiment, the plurality of cutout portions 40-3 may divide the first panel member 40*a* into a first region 40-1 and a second region 40-2. The first region 40-1 and the second region 40-2 may be connected to each other via a bridge portion 40-4 arranged between adjacent cutout portions 40-3. In such an embodiment, one surface of the first region 40-1 and one surface of the second region 40-2 may be arranged on a same plane as each other. According to an alternative embodiment, the first region 40-1 and the second region 40-2 may be arranged on different planes from each other.

In such an embodiment, a height difference according to various members arranged on one surface of the first region 40-1 and one surface of the second region 40-2 may be mitigated by the cutout portion 40-3. In an embodiment, for example, where the film member 30 is not disposed on one surface of the first region 40-1 and the film member 30 is formed on one surface of the second region 40-2, a portion of the first region 40-1 may enter or be disposed in the opening region 31.

In an embodiment, an edge cutout portion 40-5 corresponding to the edge of the film member 30 may be arranged in the second region 40-2. In such an embodiment, the edge cutout portion 40-5 may be formed in a same or similar manner as or to the cutout portion 40-3, and may be formed to correspond to the edge of the film member 30. In such an embodiment, the edge cutout portion 40-5 may divide the second region 40-2 into a first second region 40-2*a* and a second second region 40-2*b*.

Figure 3B:
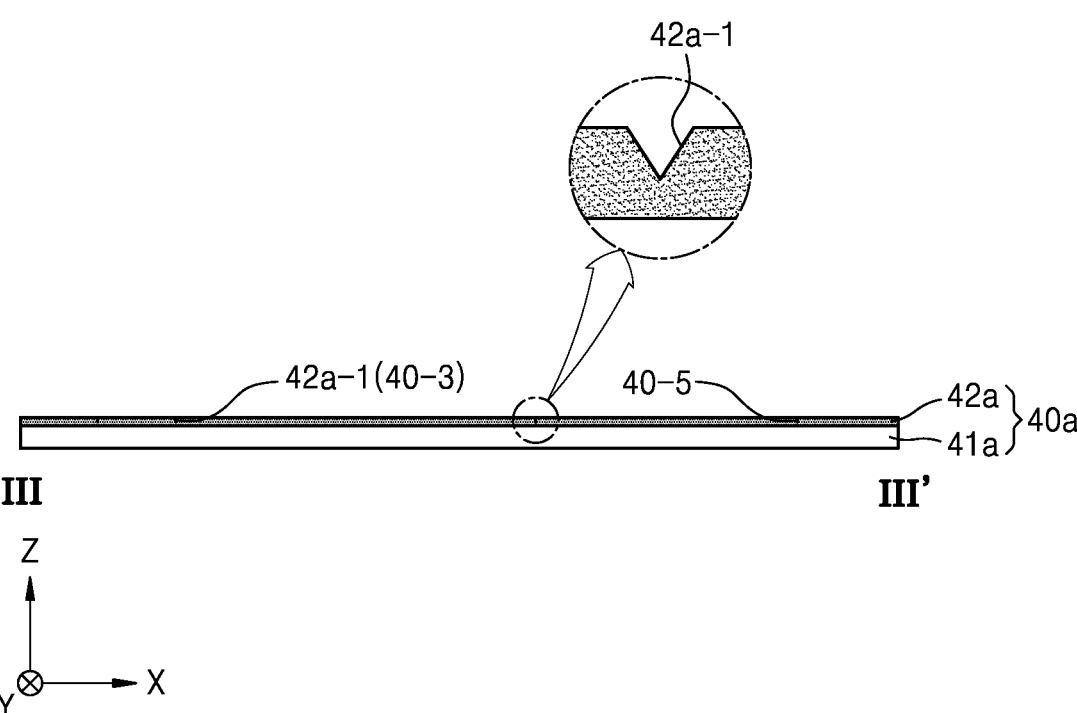
FIGS. 3B through 3D are cross-sectional views of the panel member taken along line III-III' of FIG. 3A.
Figure 3C:
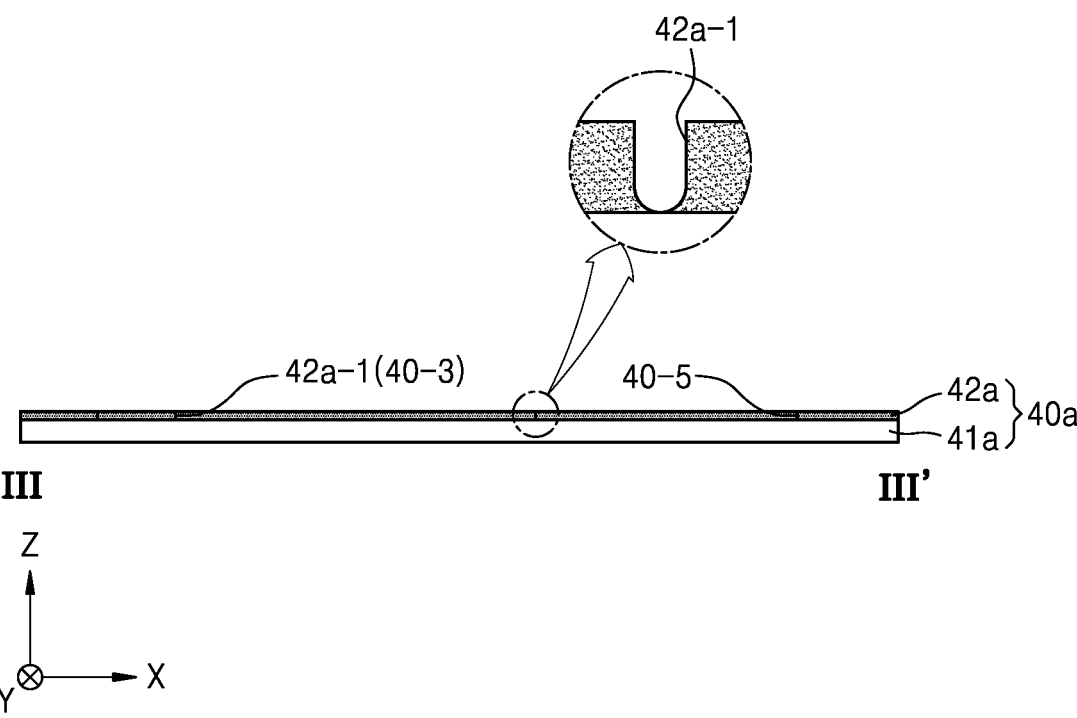
Figure 3D:
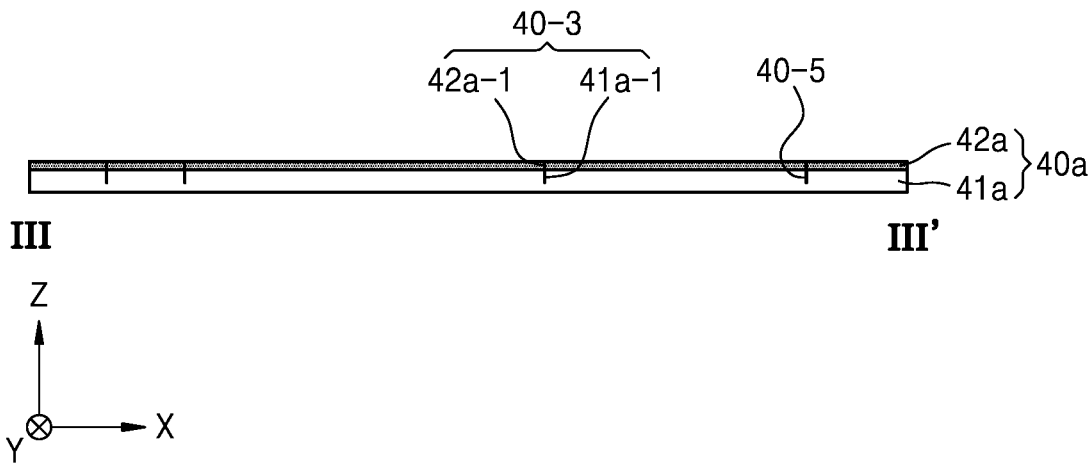

FIGS. 3B through 3D are cross-sectional views taken along line III-III' of FIG. 3A.

Referring to FIG. 3B, in an embodiment, the cutout portion 40-3 may be formed in the first adhesive portion 42*a* of the first panel member 40*a*. In such an embodiment, the cutout portion 40-3 may be formed in a thickness direction of the first adhesive portion 42*a*. In such an embodiment, a height of the cutout portion 40-3 may be less than a thickness of the first adhesive portion 42*a*. In such an embodiment, the cutout portion 40-3 may be formed in only a portion of the first adhesive portion 42*a*. Here, a cutout portion formed in only a portion of a layer means a cutout portion formed partially in the layer in a thickness direction thereof, without being completely through the layer in the thickness direction thereof. In an embodiment, for example, the cutout portion 40-3 may include a first cutout portion 42*a*-1 formed in the first adhesive portion 42*a*.

In such an embodiment, a cross-sectional shape of the cutout portion 40-3 may be a triangle, a semicircle, a portion of a circle, a portion of an ellipse, or a U-shape.

Referring to FIG. 3C, in an alternative embodiment, the cutout portion 40-3 may be formed substantially entirely in the thickness direction of the first adhesive portion 42*a* of the first panel member 40*a*. In such an embodiment, the cutout portion 40-3 may be formed substantially through the first adhesive portion 42*a* of the first panel member 40*a* in the thickness direction thereof. In such an embodiment, the height of the cutout portion 40-3 may be equal to the thickness of the first adhesive portion 42*a*. In such an embodiment, the cutout portion 40-3 may include a first cutout portion 42*a*-1 formed in the first adhesive portion 42*a*.

Referring to FIG. 3D, in another alternative embodiment, the cutout portion 40-3 may be formed through the first adhesive portion 42*a* in the thickness direction thereof and in a portion of the first panel member body portion 41*a*. In an embodiment, for example, the cutout portion 40-3 may include a first cutout portion 42*a*-1 arranged in the first adhesive portion 42*a* and a second cutout portion 41*a*-1 arranged partly in the first panel member body portion 41*a*. The first cutout portion 42*a*-1 and the second cutout portion 41*a*-1 may be connected to each other. The first cutout portion 42*a*-1 may be formed through the first adhesive portion 42*a* in the thickness direction thereof. The second cutout portion 41*a*-1 may be formed in a portion of the first panel member body portion 41*a*.

According to an embodiment as described above, the edge cutout portion 40-5 may be formed simultaneously with forming of the cutout portion 40-3, or may be formed after the cutout portion 40-3 is formed. Alternatively, after the edge cutout portion 40-5 is formed, the cutout portion 40-3 may be formed. The edge cutout portion 40-5 is the same as or similar to the cutout portion 40-3, and thus, a detailed description thereof is omitted herein.

In an embodiment of a method of manufacturing the panel member 40, after the first adhesive portion 42*a* and the first panel member body portion 41*a* are bonded with each other, the cutout portion 40-3 may be formed. in such an embodiment, the cutout portion 40-3 may be formed by using a blade of a knife or a laser. In such an embodiment, the plurality of cutout portions 40-3 may be formed simultaneously or sequentially.

In an embodiment, the edge cutout portion 40-5 may be arranged around the cutout portion 40-3. The edge cutout portion 40-5 may be formed in a same or similar manner as or to the cutout portion 40-3.

Figure 4A:
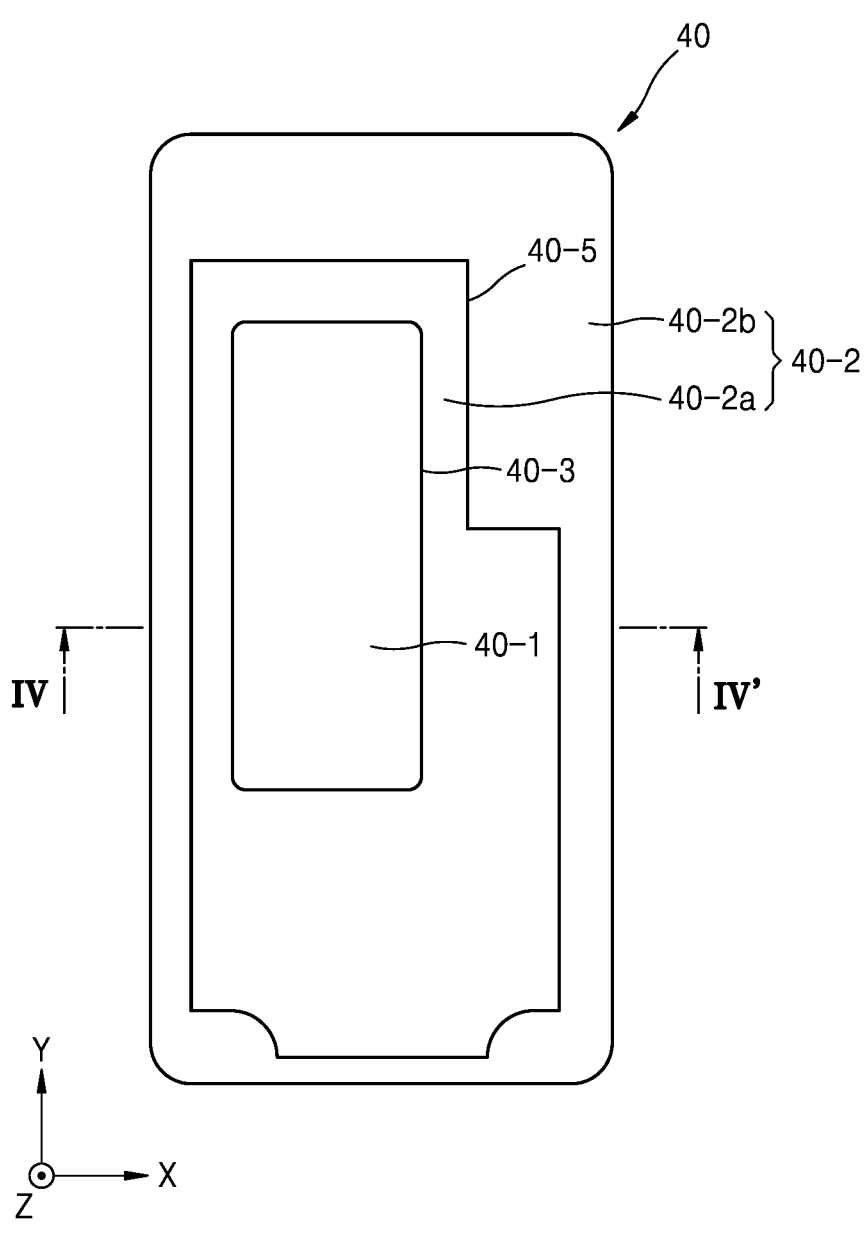
FIG. 4A is a schematic plan view of a panel member of a protection panel according to an alternative embodiment.

FIG. 4A is a schematic plan view of a panel member of a protection panel according to an alternative embodiment.

Referring to FIG. 4A, in an embodiment, a cutout portion 40-3 may form a closed loop in a top view of the panel member 40. In such an embodiment, the panel member 40 may be divided into a first region 40-1 and a second region 40-2. In such an embodiment, the first region 40-1 and the second region 40-2 may be disposed on a same plane as each other or on different planes from each other.

In such an embodiment, an edge cutout portion 40-5 may be arranged in the second region 40-2. The edge cutout portion 40-5 may form a closed circuit and may divide the second region 40-2 into a first second region 40-2*a* and a second second region 40-2*b*. In such an embodiment, the edge cutout portion 40-5 may have a shape corresponding to the edge of the film member 30.

FIGS. 4B through 4E are cross-sectional views taken along line IV-IV' of FIG. 4A.

Referring to FIGS. 4B through 4E, an embodiment of the panel member 40 may include a first panel member 40a and a second panel member 40b stacked on each other. The panel member 40 may include the cutout portion 40-3. The cutout portion 40-3 may be formed in various shapes.

The first panel member 40a may include a first panel member body portion 41a and a first adhesive portion 42a stacked on each other, and the second panel member 40b may include a second panel member body portion 41b and a second adhesive portion 42b stacked on each other. In such an embodiment, the first adhesive portion 42a, the first panel member body portion 41a, the second adhesive portion 42b, and the second panel member body portion 41b may be sequentially disposed from top to bottom as in FIG. 4B.

Each of the first adhesive portion 42a and the second adhesive portion 42b may include an adhesive material. An adhesive force of the first adhesive portion 42a may be different from that of the second adhesive portion 42b. In an embodiment, for example, the adhesive force of the first adhesive portion 42a may be less than that of the second adhesive portion 42b. In such an embodiment, the adhesive force of the second adhesive portion 42b may be about 50 or more times that of the first adhesive portion 42a. Accordingly, even when the first adhesive portion 42a is attached to another member and the panel member 40 is removed from the other member, the first adhesive portion 42a and the first panel member body portion 41a may not remain on the other member.

Figure 4B:
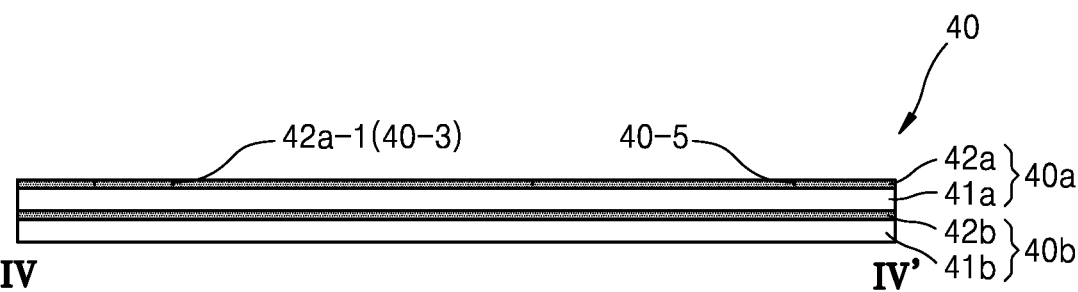
FIGS. 4B through 4E are cross-sectional views of the panel member taken along line IV-IV' of FIG. 4A.
Figure 4B:
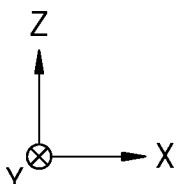

Referring to FIG. 4B, in an embodiment, the cutout portion 40-3 may include a first cutout portion 42a-1 formed in a thickness direction of the first adhesive portion 42a. In such an embodiment, the first cutout portion 42a-1 may be formed in at least a portion of the first adhesive portion 42a. In an embodiment, for example, a height of the first cutout portion 42a-1 may be less than or equal to a thickness of the first adhesive portion 42a.

Figure 4C:
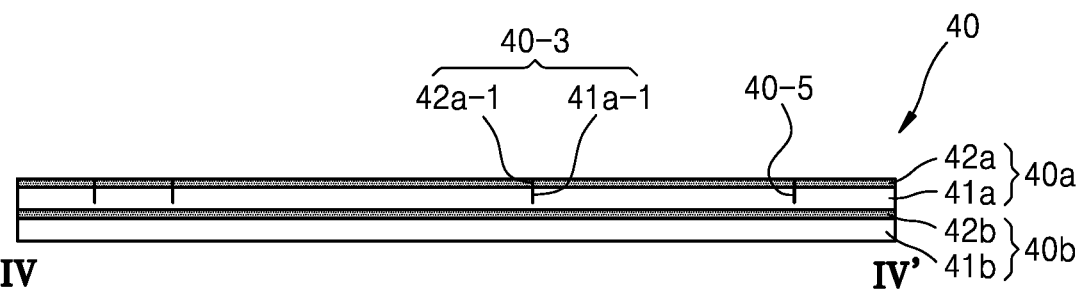
Figure 4C:
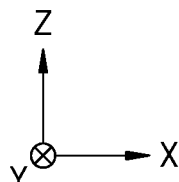

Referring to FIG. 4C, in an alternative embodiment, the cutout portion 40-3 may include a first cutout portion 42a-1 formed in the first adhesive portion 42a and a second cutout portion 41a-1 formed in the first panel member body portion 41a. The first cutout portion 42a-1 and the second cutout portion 41a-1 may be connected to each other.

The first cutout portion 42a-1 may be formed through the first adhesive portion 42a. In such an embodiment, the first cutout portion 42a-1 may be formed by the thickness of the first adhesive portion 42a in the thickness direction of the first adhesive portion 42a. The second cutout portion 41a-1 may be formed in at least a portion of the first panel member body portion 41a. In such an embodiment, a height of the second cutout portion 41a-1 may be less than or equal to a thickness of the first panel member body portion 41a.

Figure 4D:
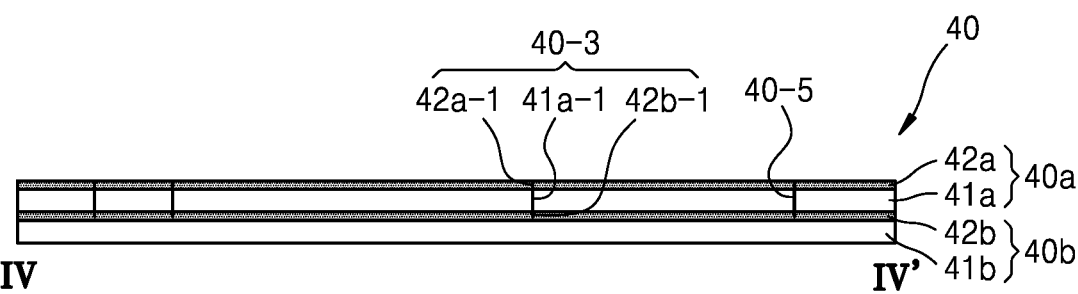
Figure 4D:
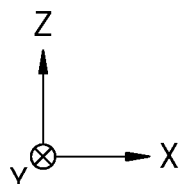

Referring to FIG. 4D, in another alternative embodiment, the cutout portion 40-3 may include a first cutout portion 42a-1 formed in the first adhesive portion 42a, a second cutout portion 41a-1 formed in the first panel member body portion 41a, and a third cutout portion 42b-1 formed in the second adhesive portion 42b. In formed, the first cutout portion 42a-1 may be formed through the first adhesive portion 42a, and the second cutout portion 41a-1 may be formed through the first panel member body portion 41a. The third cutout portion 42b-1 may be formed in at least a portion of the second adhesive portion 42b. In such an embodiment, a height of the third cutout portion 42b-1 may be formed in the second adhesive portion 42b to be less than or equal to a thickness of the second adhesive portion 42b.

The first cutout portion 42a-1, the second cutout portion 41a-1, and the third cutout portion 42b-1 may be connected to one another.

Figure 4E:
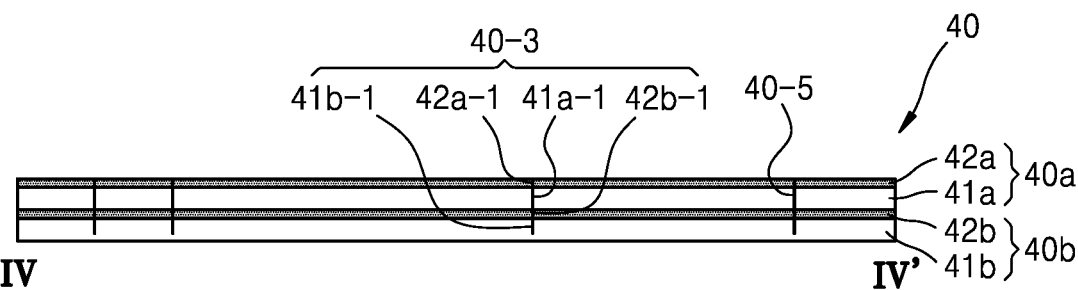
Figure 4E:
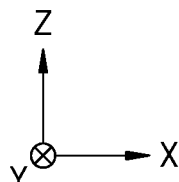

Referring to FIG. 4E, in another alternative embodiment, the cutout portion 40-3 may include a first cutout portion 42a-1 formed in the first adhesive portion 42a, a second cutout portion 41a-1 formed in the first panel member body portion 41a, a third cutout portion 42b-1 formed in the second adhesive portion 42b, and a fourth cutout portion 41b-1 formed in the second panel member body portion 41b. The first cutout portion 42a-1, the second cutout portion 41a-1, the third cutout portion 42b-1, and the fourth cutout portion 41b-1 may be formed to be connected to one another.

In such an embodiment, the first cutout portion 42a-1 may be formed through the first adhesive portion 42a, and the second cutout portion 41a-1 may be formed through the first panel member body portion 41a. The third cutout portion 42b-1 may be formed through the second adhesive portion 42b. In such an embodiment, the fourth cutout portion 41b-1 may be formed in only a portion of the second panel member body portion 41b. In such an embodiment, a height of the fourth cutout portion 41b-1 may be less than a thickness of the second panel member body portion 41b.

In an embodiment, a cross-sectional shape of the cutout portion 40-3 may be a triangle, a semicircle, a portion of a circle, a portion of an ellipse, or a U-shape.

In an embodiment, the edge cutout portion 40-5 may be arranged around the cutout portion 40-3. The edge cutout portion 40-5 may have a same or similar shape as or to cutout portion 40-3.

Figure 5:
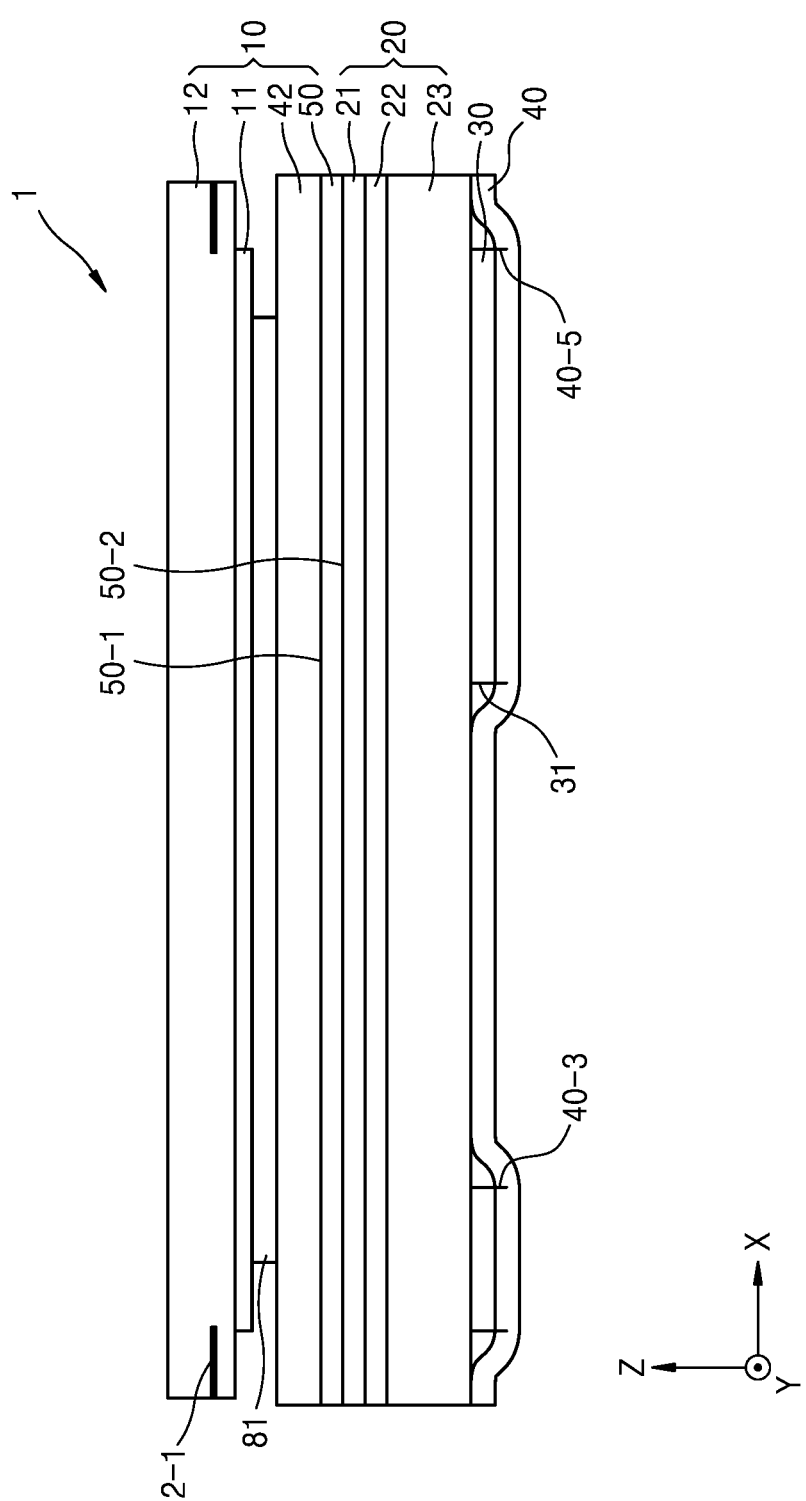
FIG. 5 is a schematic cross-sectional view of a display apparatus according to an alternative embodiment.

FIG. 5 is a schematic cross-sectional view of a display apparatus according to an alternative embodiment.

Referring to FIG. 5, an embodiment of a display apparatus 1 may include a display panel unit 10 and the protection panel. The display panel unit 10 may include a cover window 11, a protection member 12, an optical functional layer 42, and a display panel 50. The protection panel may include a cover member 20 attached to the display panel 50, a film member 30, and a panel member 40. The display panel unit 10 and the protection panel are the same as or similar to those described above, and thus, any repetitive detailed description thereof will be omitted herein.

A portion of the panel member 40 may be formed to be stepped, that is, has a step structure. In an embodiment, for example, a portion of the panel member 40 may enter or be disposed in the opening region 31 of the film member 30. In such an embodiment, the portion of the panel member 40 overlapping the opening region 31 may be attached to the cover member 20 through the opening region 31.

In such an embodiment, the portion of the panel member 40 arranged in the opening region 31 and an end portion of the panel member 40 arranged on an end of the film member 30 may be disposed in (or inserted into) the opening region 31, and the panel member 40 may bend at the boundary of the opening region 31.

In such an embodiment, the cutout portion 40-3 may be defined along a boundary of the opening region 31. In such an embodiment, when the display panel 50 is pressed and attached to the protection panel, the film member 30 may be compressed due to a force applied to the display panel 50, and a portion of the panel member 40 corresponding to the opening region 31 on the basis of the cutout portion 40-3 may be pressed into the opening region 31, so that a portion of the panel member 40, where the film member 30 is not arranged, may exhibit a similar effect to a portion of the panel member 40, where the film member 30 is arranged. In such an embodiment, attachment of the display panel 50 to the protection member 12 is performed using a roller that contacts the display panel 50 or the protection member 12, and the roller may apply a force to the display panel 50 by contacting one surface of the display panel 50 in the form of a linear contact with the one surface of the display panel 50. In such an embodiment, a force applied to the display panel 50 in a lengthwise direction of the roller is uniform, and thus, the display panel 50 and the protection panel may be uniformly attached to each other and the occurrence of bubbles between the display panel 50 and the protection panel may be effectively prevented.

Figure 6:
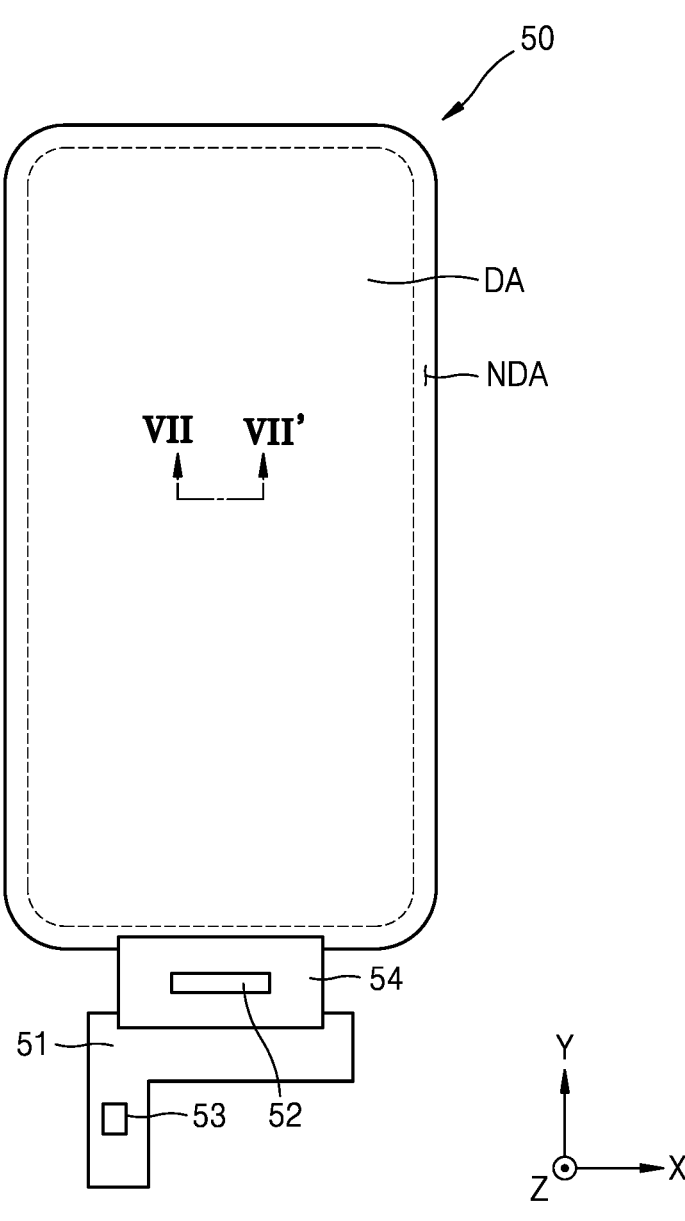
FIG. 6 is a schematic plan view of a display panel according to an embodiment.
Figure 7:
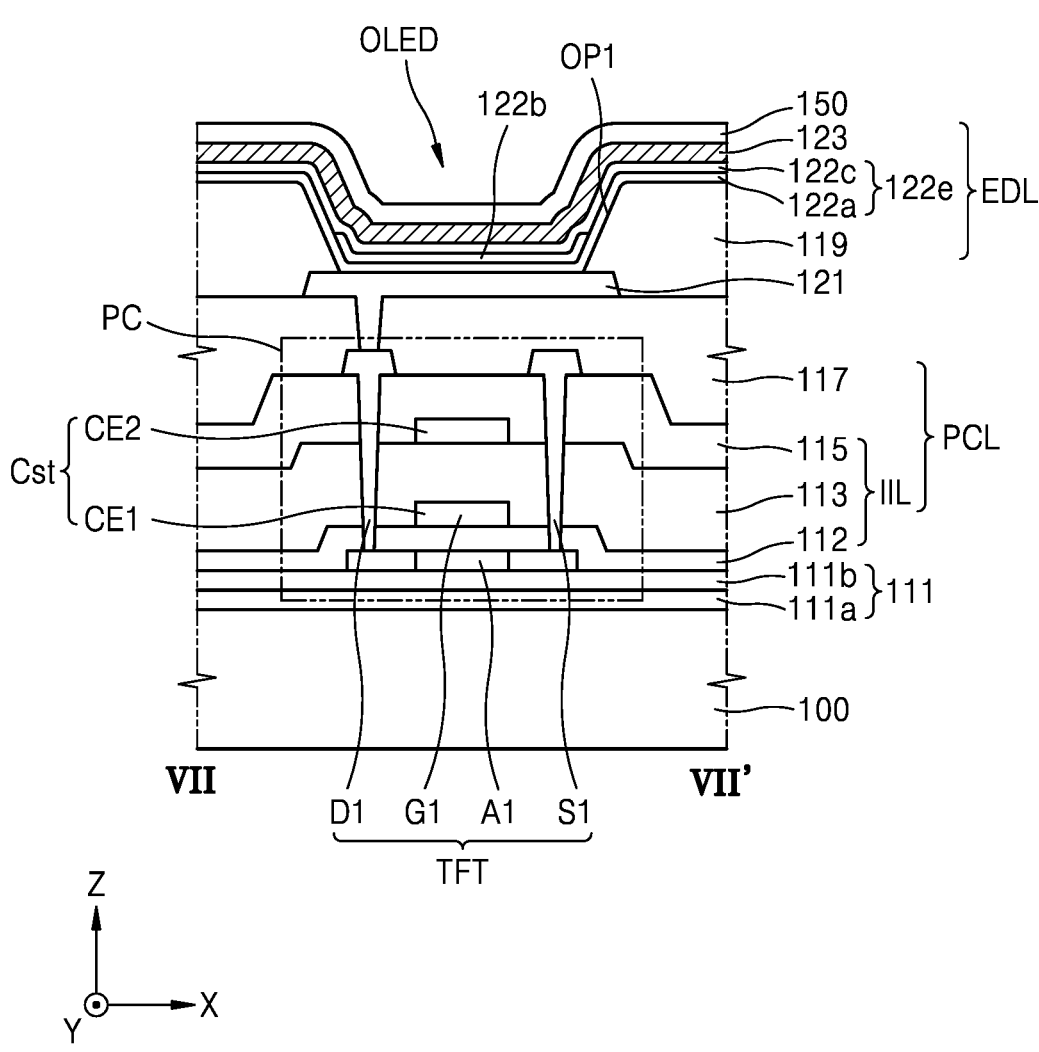
FIG. 7 is a schematic cross-sectional view of a portion of the display panel of FIG. 6.

FIG. 6 is a schematic plan view of a display panel according to an embodiment. FIG. 7 is a schematic cross-sectional view of a portion of the display panel of FIG. 6.

Referring to FIGS. 6 and 7, an embodiment of the display panel 50 may be a rigid display panel having rigidity and thus not easily bent, or a flexible display panel having flexibility and thus easily bent, folded, or rolled. In an embodiment, for example, the display panel 50 may be a foldable display panel, a curved display panel having a curved display surface, a bent display panel of which an area other than a display surface is bent, a rollable display panel, or a stretchable display panel.

The display panel 50 may be a transparent display panel that is realized to be transparent so that an object or a background arranged on the lower surface of the display panel 50 may be seen through the upper surface of the display panel 50. Alternatively, the display panel 50 may be a reflective display panel capable of reflecting an image of an object or a background on the upper surface of the display panel 50.

A first flexible film 54 may be attached to an edge of the display panel 50. One side of the first flexible film 54 may be attached to an edge of the display panel 50 by using an anisotropic conductive film. The first flexible film 54 may be a flexible film that is bendable.

The display driving unit 52 may be disposed on the first flexible film 54. The display driving unit 52 may receive control signals and power supply voltages and generate and output signals and voltages for driving the display panel 50. The display driving unit 52 may be implemented as an integrated circuit (IC).

A display circuit board 51 may be attached on another side of the first flexible film 54. The other side of the first flexible film 54 may be attached to an upper surface of the display circuit board 51 by using an anisotropic conductive film. The display circuit board 51 may be a flexible printed circuit board (FPCB) that is bendable, a rigid printed circuit board (PCB) that has rigidity and thus is not easily bent, or a complex PCB including both a rigid PCB and an FPCB.

A touch sensor driving unit 53 may be disposed on the display circuit board 51. The touch sensor driving unit 53 may be implemented as an IC. The touch sensor driving unit 53 may be attached onto the display circuit board 51. The touch sensor driving unit 53 may be electrically connected to touch electrodes of a touch screen layer of the display panel 50 via the display circuit board 51.

The touch screen layer of the display panel 50 may sense a touch input of a user by using at least one of several touch methods, such as a resistance film method and a capacitance method. In an embodiment, for example, where the touch screen layer of the display panel 50 senses a touch input of a user by using a capacitance method, the touch sensor driving unit 53 may apply driving signals to driving electrodes from among the touch electrodes and sense voltages charged in a mutual capacitance between sensing electrodes from among the touch electrodes and the driving electrodes via the sensing electrodes, thereby determining whether there is a touch of a user. The touch of the user may include a contact touch and a proximity touch. The contact touch indicates that a finger of a user or an object, such as a pen, directly touches a cover member disposed on the touch screen layer. The proximity touch indicates that a finger of a user or an object, such as a pen, is located over the cover member at a close distance from the cover member, such as hovering. The touch sensor driving unit 53 may transmit sensor data to a main processor according to the sensed voltages, and the main processor may calculate a touch coordinate at which a touch is input, by analyzing the sensor data.

A power supplier for supplying driving voltages for driving the pixels of the display panel 50, a scan driving unit, and the display driving unit 52 may be additionally disposed on the display circuit board 51. Alternatively, the power supplier may be integrated with the display driving unit 52. In this case, the display driving unit 52 and the power supplier may be realized as a single IC.

The location of the display driving unit 52 as described above is not limited to the above, and may be disposed on a substrate 100. According to an alternative embodiment, the display driving unit 52 may be disposed on the display circuit board 51.

The substrate 100 may include an insulating material, such as glass, quartz, or polymer resin. The substrate 100 may be a rigid substrate or a flexible substrate that is bendable, foldable, or rollable. In an embodiment, for example, the substrate 100 may include polymer resin, such as polyethersulphone, polyacrylate, polyetherimide, polyethylene naphthalate, polyethylene terephthalate, polyphenylene sulfide, polyarylate, polyimide, polycarbonate, or cellulose acetate propionate. The substrate 100 may have a multi-layered structure including a layer including the aforementioned polymer resin and an inorganic layer (not shown). In an embodiment, for example, the substrate 100 may include two layers and an inorganic barrier layer between the two layers, each layer including the aforementioned polymer resin.

A display layer may be disposed on the substrate 100. The display layer may include pixels, and may be a layer that displays an image. The display layer may include a circuit layer including thin-film transistors, a display element layer on which display elements are arranged, and an encapsulation member for encapsulating the display element layer.

The display layer may be divided into a display area DA and a peripheral area NDA. The display area DA may be an area that includes pixels arranged therein and displays an image. The peripheral area NDA may be an area that is outside the display area DA and displays no images. The peripheral area NDA may be arranged to surround the display area DA. The peripheral area NDA may be an area ranging from the outside of the display area DA to the edge of the display panel 50. In the display area DA, not only the pixels but also pixel circuits driving the pixels, and scan lines, data lines, and power lines connected to the pixel circuits may be arranged. In the peripheral area NDA, a scan driving unit for applying scan signals to the scan lines, and fan out lines that connect the data lines to the display driving unit 52 may be arranged.

The touch screen layer may be disposed on the display layer. The touch screen layer may include touch electrodes, and may sense whether there is a user's touch. In an embodiment, the touch screen layer may be formed directly on an encapsulation member of the display layer. Alternatively, the touch screen layer may be separately provided and then coupled onto the encapsulation member of the display layer via an adhesive layer, such as an OCA.

As described above, the display panel 50 may include the display area DA and the peripheral area NDA. Subpixels may be arranged in the display area DA to implement an image, and wiring or the like may be arranged in the peripheral area NDA. The display panel 50 may be defined by a stack of the substrate 100, a buffer layer 111, a circuit layer PCL, and a display element layer EDL.

As described above, the substrate 100 may include an insulating material, such as glass, quartz, or polymer resin. The substrate 100 may be a rigid substrate or a flexible substrate that is bendable, foldable, or rollable.

The buffer layer 111 may be positioned on the substrate 100 and may reduce or prevent infiltration of a foreign material, moisture, or ambient air from below the substrate 100 and may provide a flat surface on the substrate 100. The buffer layer 111 may include an inorganic material (such as oxide or nitride), an organic material, or an organic and inorganic compound, and may be a single layer or layers of an inorganic material and an organic material. A barrier layer (not shown) may be between the substrate 100 and the buffer layer 111 to prevent infiltration of ambient air. According to some embodiments, the buffer layer 111 may include silicon oxide ($SiO_2$) or silicon nitride ($SiN_x$). The buffer layer 111 may include a first buffer layer 111a and a second buffer layer 111b, which are stacked one on another.

The circuit layer PCL may be on the buffer layer 111, and may include a pixel circuit PC, an insulating layer IIL, and a planarization layer 117. The pixel circuit PC may include a thin-film transistor TFT and a storage capacitor Cst.

The thin-film transistor TFT may be disposed over the buffer layer 111. The thin-film transistor TFT includes a first semiconductor layer A1, a first gate electrode G1, a first source electrode S1, and a first drain electrode D1. The thin-film transistor TFT may be connected to an organic light-emitting diode OLED and may drive the organic light-emitting diode OLED. A plurality of organic light-emitting diodes OLED may be included. A plurality of organic light-emitting diodes OLED may emit light beams of the same color. According to another embodiment, the plurality of organic light-emitting diodes OLED may emit light beams of different colors. In this case, each organic light-emitting diode OLED may form a single subpixel, as described above.

In an embodiment, the first semiconductor layer A1 may be on the buffer layer 111 and may include polysilicon. According to an alternative embodiment, the first semiconductor layer A1 may include amorphous silicon. According to another alternative embodiment, the first semiconductor layer A1 may include oxide of at least one material selected from indium (In), gallium (Ga), tin (Sn), zirconium (Zr), vanadium (V), hafnium (Hf), cadmium (Cd), germanium (Ge), chromium (Cr), titanium (Ti), and zinc (Zn). The first semiconductor layer A1 may include a channel region, and a source region and a drain region doped with impurities.

The insulating layer IIL may be disposed on the first semiconductor layer A1. In an embodiment, the insulating layer IIL may include a first gate insulating layer 112, a second gate insulating layer 113, and an interlayer insulating layer 115. Alternatively, the at least one selected from the first gate insulating layer 112, the second gate insulating layer 113, and the interlayer insulating layer 115 may be omitted from the insulating layer IIL.

The first gate insulating layer 112 may be included to cover the first semiconductor layer A1. The first gate insulating layer 112 may include an inorganic insulating material, such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$). The zinc oxide ($ZnO_x$) may be a zinc oxide (ZnO) and/or a zinc peroxide ($ZnO_2$). The first gate insulating layer 112 may be a single layer or multi-layer, each layer therein including at least one selected from the aforementioned inorganic insulating materials.

The first gate electrode G1 is disposed above the first gate insulating layer 112 to overlap the first semiconductor layer A1. The first gate electrode G1 may include molybdenum (Mo), aluminum (Al), copper (Cu), or titanium (Ti), and may be a single layer or multi-layers. In an embodiment, for example, the first gate electrode G1 may be a single layer of Mo.

The second gate insulating layer 113 may cover the first gate electrode G1. The second gate insulating layer 113 may include an inorganic insulating material, such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$). The zinc oxide ($ZnO_x$) may be a zinc oxide (ZnO) and/or a zinc peroxide ($ZnO_2$). The second gate insulating layer 113 may be a single layer or multi-layer, each layer therein including at least one selected from the aforementioned inorganic insulating materials.

A first upper electrode CE2 of the storage capacitor Cst may be disposed above the second gate insulating layer 113.

In the display area DA, the first upper electrode CE2 may overlap the first gate electrode G1. The first gate electrode G1 and the first upper electrode CE2 overlapping each other with the second gate insulating layer 113 therebetween may constitute the storage capacitor Cst. The first gate electrode G1 may be the first lower electrode CE1 of the storage capacitor Cst.

The first upper electrode CE2 may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), and/or copper (Cu), and may be a single layer or multi-layer, each layer therein including at least one selected from the aforementioned materials.

The interlayer insulating layer 115 may cover the first upper electrode CE2. The interlayer insulating layer 115 may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), zinc oxide ($ZnO_x$), or the like. The zinc oxide ($ZnO_x$) may be a zinc oxide (ZnO) and/or a zinc peroxide ($ZnO_2$). The interlayer insulating layer 115 may be a single layer or multi-layer, each layer therein including at least one selected from the aforementioned inorganic insulating materials.

The first source electrode S1 and the first drain electrode D1 are disposed on the interlayer insulating layer 115. Each of the first source electrode S1 and the first drain electrode D1 may include a conductive material including, for example, Mo, Al, Cu, and Ti, and may be a multi-layer or single layer, each layer therein including at least one selected from the aforementioned materials. In an embodiment, for example, each of the first source electrode S1 and the first drain electrode D1 may be a multi-layer of Ti/Al/Ti.

The planarization layer 117 may cover the first source electrode S1 and the first drain electrode D1. The planarization layer 117 may have a flat upper surface such that a pixel electrode 121 to be disposed above the planarization layer 117 is formed flat.

The planarization layer 117 may include an organic material or an inorganic material and may have a single layer structure or a multi-layer structure. The planarization layer 117 may include a commercial polymer such as benzocyclobutene (BCB), polyimide, hexamethyldisiloxane (HMDSO), polymethyl methacrylate (PMMA) or polystyrene (PS), a polymer derivative having a phenol-based group, an acryl-based polymer, an imide-based polymer, an aryl ether-based polymer, an amide-based polymer, a fluorine-based polymer, a p-xylene-based polymer, a vinyl alcohol-based polymer, or the like. The planarization layer 117 may include an inorganic insulating material, such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$). The zinc oxide ($ZnO_x$) may be a zinc oxide (ZnO) and/or a zinc peroxide ($ZnO_2$). When the planarization layer 117 is formed, a layer may be formed, and then chemical and mechanical polishing may be performed on the upper surface of the layer to provide a flat upper surface.

The planarization layer 117 may define a via hole via which one of the first source electrode S1 and the first drain electrode D1 of the thin-film-transistor TFT is exposed, and the pixel electrode 121 may contact the first source electrode S1 or the first drain electrode D1 via the via hole and may be electrically connected to the thin-film-transistor TFT.

The pixel electrode 121 may include conductive oxide such as indium tin oxide (ITO), indium zinc oxide (IZO), zinc oxide (ZnO), indium oxide ($In_2O_3$), indium gallium oxide (IGO), or aluminum zinc oxide (AZO). The pixel electrode 121 may include a reflection layer including silver (Ag), magnesium (Mg), aluminum (Al), platinum (Pt), palladium (Pd), gold (Au), nickel (Ni), neodymium (Nd), iridium (Ir), chromium (Cr), or a compound of these materials. In an embodiment, for example, the pixel electrode 121 may have a structure including films including ITO, IZO, ZnO, or $In_2O_3$ above/below the aforementioned reflection layer. In such an embodiment, the pixel electrode 121 may have a stack structure of ITO/Ag/ITO.

A pixel defining layer 119 may be disposed on the planarization layer 117 to cover an edge of the pixel electrode 121, and may define a first opening OP1 exposing a center portion of the pixel electrode 121. The first opening OP1 defines the size and shape of a light-emission area of the organic light-emitting diode OLED, namely, a subpixel Pm.

The pixel defining layer 119 may prevent an electric arc or the like from occurring on the edge of the pixel electrode 121 by increasing a distance between the edge of the pixel electrode 121 and an opposite electrode 123 over the pixel electrode 121. The pixel defining layer 119 may be formed of an organic insulating material, such as polyimide, polyamide, acryl resin, benzocyclobutene, hexamethyldisiloxane (HMDSO), or phenol resin, via spin coating or the like.

A first emission layer 122b is arranged within the first opening OP1 of the pixel defining layer 119 to correspond to the pixel electrode 121. The first emission layer 122b may include a high molecular weight material or a low molecular weight material, and may emit red, green, blue, or white light.

An organic functional layer 122e may be disposed above and/or below the first emission layer 122b. The organic functional layer 122e may include a first functional layer 122a and/or a second functional layer 122c. Alternatively, the first functional layer 122a or the second functional layer 122c may be omitted.

The first functional layer 122a may be disposed below the first emission layer 122b. The first functional layer 122a may be a single layer or layers including an organic material. The first functional layer 122a may be a hole transport layer (HTL) that is a single layer. Alternatively, the first functional layer 122a may include a hole injection layer (HIL) and an HTL. The first functional layer 122a may be integrally or commonly provided to correspond to organic light-emitting diodes OLED included in the display area DA.

The second functional layer 122c may be disposed above the first emission layer 122b. The second functional layer 122c may be a single layer or layers including an organic material. The second functional layer 122c may include an electron transport layer (ETL) and/or an electron injection layer (EIL). The second functional layer 122c may be integrally or commonly provided to correspond to the organic light-emitting diodes OLED included in the display area DA.

The opposite electrode 123 is disposed above the second functional layer 122c. The opposite electrode 123 may include a conductive material having a low work function. In an embodiment, for example, the opposite electrode 123 may include a (semi)transparent layer including, for example, silver (Ag), magnesium (Mg), aluminum (Al), platinum (Pt), palladium (Pd), gold (Au), nickel (Ni), neodymium (Nd), iridium (Ir), chromium (Cr), lithium (Li), calcium (Ca) or an alloy of these materials. Alternatively, the opposite electrode 123 may further include a layer, such as ITO, IZO, ZnO, or $In_2O_3$, on the (semi)transparent layer including any of the above-described materials. The opposite electrode 123 may be integrally or commonly provided to correspond to the organic light-emitting diodes OLED included in the display area DA.

The layers ranging from the pixel electrode 121 to the opposite electrode 123 arranged in the display area DA may constitute an organic light-emitting diode OLED.

An upper layer 150 including an organic material may be formed on the opposite electrode 123. The upper layer 150 may be provided to protect the opposite electrode 123 and also increase light extraction efficiency. The upper layer 150 may include an organic material having a higher refractive index than the opposite electrode 123. Alternatively, the upper layer 150 may be a stack of layers having different refractive indexes. In an embodiment, for example, the upper layer 150 may be provided by stacking a high refractive index layer, a low refractive index layer, and a high refractive index layer in this stated order. In such an embodiment, the high refractive index layer may have a refractive index of about 1.7 or more, and the low refractive index layer may have a refractive index of about 1.3 or less.

The upper layer 150 may additionally include lithium fluoride (LiF). Alternatively, the upper layer 150 may include an inorganic insulating material, such as silicon oxide ($SiO_2$) or silicon nitride ($SiN_x$). The upper layer 150 may be omitted according to need. For convenience of description, embodiments where the upper layer 150 is disposed on the opposite electrode 123 will now be focused on and described in detail.

Although not shown in the drawings, the display panel 50 may include an encapsulation member (not shown) shielding the upper layer 150. According to an embodiment, the encapsulation member may include an encapsulation substrate (not shown) arranged opposite to the substrate 100, and a sealing member (not shown) arranged between the substrate 100 and the encapsulation substrate to block a space between the substrate 100 and the encapsulation substrate from the outside.

According to an alternative embodiment, the encapsulation member may include a thin-film encapsulation layer. The thin-film encapsulation layer may be disposed on the upper layer 150 to directly contact the upper layer 150. The thin-film encapsulation layer may cover respective portions of the display area DA and the peripheral area NDA to prevent infiltration of external moisture and oxygen. The thin-film encapsulation layer may include at least one organic encapsulation layer and at least one inorganic encapsulation layer. For convenience of description, embodiments where the thin-film encapsulation layer includes a first inorganic encapsulation layer, an organic encapsulation layer, and a second inorganic encapsulation layer sequentially stacked on an upper surface of the upper layer 150 will now be focused on and described in detail.

In such an embodiment, the first inorganic encapsulation layer may cover the opposite electrode 123 and may include a silicon oxide, a silicon nitride, and/or a silicon oxynitride. Because the first inorganic encapsulation layer is formed along a structure below the first inorganic encapsulation layer, an upper surface thereof is not flat. The organic encapsulation layer covers the first inorganic encapsulation layer. In an embodiment, the organic encapsulation layer may have an approximately flat upper surface. In such an embodiment, a portion of the organic encapsulation layer corresponding to the display area DA may have an approximately flat upper surface. The organic encapsulation layer may include at least one material selected from polyethylene terephthalate, polyethylene naphthalate, polycarbonate, polyimide, polyethylene sulfonate, polyoxymethylene, polyarylate, and hexamethyldisiloxane. The second inorganic encapsulation layer may cover the organic encapsulation layer and may include a silicon oxide, a silicon nitride, and/or a silicon oxynitride.

The touch screen layer may be disposed on the encapsulation member.

Figure 8A:
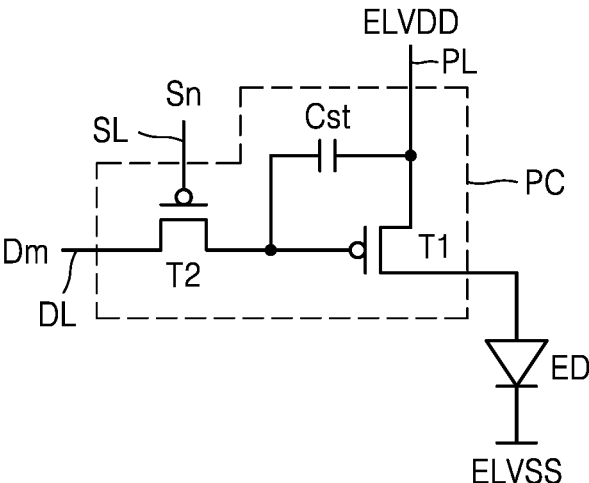
FIGS. 8A and 8B are schematic circuit diagrams illustrating a circuit of a display panel according to an embodiment.
Figure 8B:
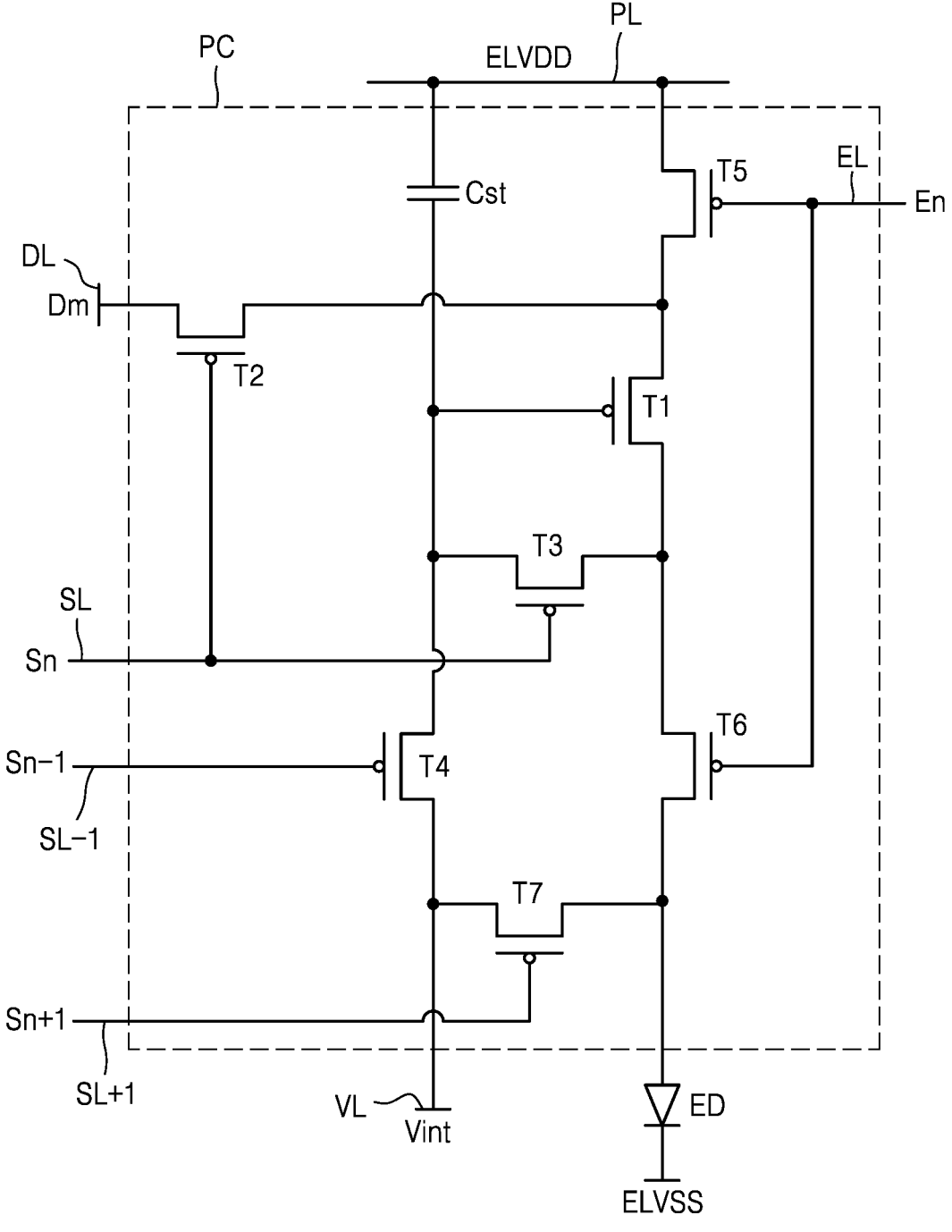

FIGS. 8A and 8B are schematic circuit diagrams illustrating a circuit of a display panel according to an embodiment.

Referring to FIGS. 8A and 8B, an embodiment of a pixel circuit PC may be connected to a light-emitting element ED to realize light emission of subpixels. The pixel circuit PC includes a driving thin-film transistor T1, a switching thin-film transistor T2, and a storage capacitor Cst. The switching thin-film transistor T2 is connected to a scan line SL and a data line DL, and is configured to transmit, to the driving thin-film transistor T1, a data signal Dm received via the data line DL in response to a scan signal Sn received via the scan line SL.

The storage capacitor Cst is connected to the switching thin-film transistor T2 and a driving voltage line PL, and stores a voltage corresponding to a difference between a voltage received from the switching thin-film transistor T2 and a driving voltage ELVDD supplied to the driving voltage line PL.

The driving thin-film transistor T1 is connected to the driving voltage line PL and the storage capacitor Cst, and may control a driving current flowing from the driving voltage line PL to the light-emitting element ED, in accordance with a voltage value stored in the storage capacitor Cst. The light-emitting element ED may emit light having a certain brightness due to the driving current.

Although an embodiment where the pixel circuit PC includes two thin-film transistors and a single storage capacitor is illustrated in FIG. 8A, embodiments are not limited thereto.

Referring to FIG. 8B, an alternative embodiment of the pixel circuit PC may include a driving thin-film transistor T1, a switching thin-film transistor T2, a compensating thin-film transistor T3, a first initializing thin-film transistor T4, an operation control thin-film transistor T5, a light-emission control thin-film transistor T6, and a second initializing thin-film transistor T7.

Although each pixel circuit PC includes signal lines, namely, a scan line SL, a previous scan line SL−1, a next scan line SL+1, a light-emission control line EL, and a data line DL, an initializing voltage line VL, and a driving voltage line PL in FIG. 8B, embodiments are not limited thereto. According to another alternative embodiment, at least one selected from the signal lines, namely, the scan line SL, the previous scan line SL−1, the next scan line SL+1, the light-emission control line EL, and the data line DL, or/and the initializing voltage line VL, may be shared by neighboring pixel circuits.

A drain electrode of the driving thin-film transistor T1 may be electrically connected to the light-emitting element ED via the light-emission control thin-film transistor T6. The driving thin-film transistor T1 receives the data signal Dm based on a switching operation of the switching thin-film transistor T2 and supplies the driving current to the light-emitting element ED.

A gate electrode of the switching thin-film transistor T2 is connected to the scan line SL, and a source electrode thereof is connected to the data line DL. A drain electrode of the switching thin-film transistor T2 may be connected to a source electrode of the driving thin-film transistor T1 and also connected to the driving voltage line PL via the operation control thin-film transistor T5.

The switching thin-film transistor T2 is turned on in response to the scan signal Sn received via the scan line SL and performs a switching operation of transmitting the data signal Dm received from the data line DL to the source electrode of the driving thin-film transistor T1.

A gate electrode of the compensating thin-film transistor T3 may be connected to the scan line SL. A source electrode of the compensating thin-film transistor T3 may be connected to the drain electrode of the driving thin-film transistor T1 and at the same time may be connected to a pixel electrode of the light-emitting element ED via the light-emission control thin-film transistor T6. A drain electrode of the compensating thin-film transistor T3 may be connected to one electrode of the storage capacitor Cst, a source electrode of the first initializing thin-film transistor T4, and a gate electrode of the driving thin-film transistor T1. The compensating thin film transistor T3 is turned on according to the scan signal Sn received via the scan line SL and connects the gate electrode and the drain electrode of the driving thin film transistor T1 to each other, thus achieving diode-connection of the driving thin film transistor T1.

A gate electrode of the first initializing thin-film transistor T4 may be connected to the previous scan line SL−1. A drain electrode of the first initializing thin-film transistor T4 may be connected to the initializing voltage line VL. A source electrode of the first initializing thin-film transistor T4 may be connected to the one electrode of the storage capacitor Cst, the drain electrode of the compensating thin film transistor T3, and the gate electrode of the driving thin-film transistor T1. The first initializing thin-film transistor T4 may be turned on in response to a previous scan signal Sn−1 received via the previous scan line SL−1 and may transmit an initializing voltage Vint to the gate electrode of the driving thin-film transistor T1 to thereby initialize a voltage of the gate electrode of the driving thin-film transistor T1.

A gate electrode of the operation control thin-film transistor T5 may be connected to the light-emission control line EL. A source electrode of the operation control thin-film transistor T5 may be connected to the driving voltage line PL. A drain electrode of the operation control thin-film transistor T5 is connected to the source electrode of the driving thin-film transistor T1 and the drain electrode of the switching thin-film transistor T2.

A gate electrode of the light-emission control thin-film transistor T6 may be connected to the light-emission control line EL. A source electrode of the light-emission control thin-film transistor T6 may be connected to the drain electrode of the driving thin-film transistor T1 and the source electrode of the compensating thin-film transistor T3. A drain electrode of the light-emission control thin-film transistor T6 may be electrically connected to the pixel electrode of the light-emitting element ED. The operation control thin-film transistor T5 and the light-emission control thin-film transistor T6 are simultaneously turned on in response to a light-emission control signal En received via the light-emission control line EL, and thus the driving voltage ELVDD is transmitted to the light-emitting element ED and the driving current flows in the light-emitting element ED.

A gate electrode of the second initializing thin-film transistor T7 may be connected to the next scan line SL+1. A source electrode of the second initializing thin-film transistor T7 may be connected to the pixel electrode of the light-emitting element ED. A drain electrode of the second initializing thin-film transistor T7 may be connected to the initializing voltage line VL. The second initializing thin-film transistor T7 may be turned on in response to a next scan signal Sn+1 received via the next scan line SL+1 and may initialize the pixel electrode of the light-emitting element ED.

Although the first initializing thin-film transistor T4 and the second initializing thin-film transistor T7 are respectively connected to the previous scan line SL−1 and the next scan line SL+1 in FIG. 8B, embodiments are not limited thereto. According to another alternative embodiment, both the first initializing thin-film transistor T4 and the second initializing thin-film transistor T7 may be connected to the previous scan line SL−1 to operate according to the previous scan signal Sn-1.

Another electrode of the storage capacitor Cst may be connected to the driving voltage line PL. The one electrode of the storage capacitor Cst may be connected to the gate electrode of the driving thin-film transistor T1, the drain electrode of the compensating thin film transistor T3, and the source electrode of the first initializing thin-film transistor T4.

An opposite electrode (for example, a cathode) of the light-emitting element ED provides a common voltage ELVSS. The light-emitting element ED receives the driving current from the driving thin-film transistor T1 and emits light.

Features of the pixel circuit PC are not limited to the number of thin-film transistors, the number of storage capacitors, and the circuit design described above with reference to FIGS. 5A and 5B. The number of thin-film transistors, the number of storage capacitors, and the circuit design may be variously modified.

Figure 9A:
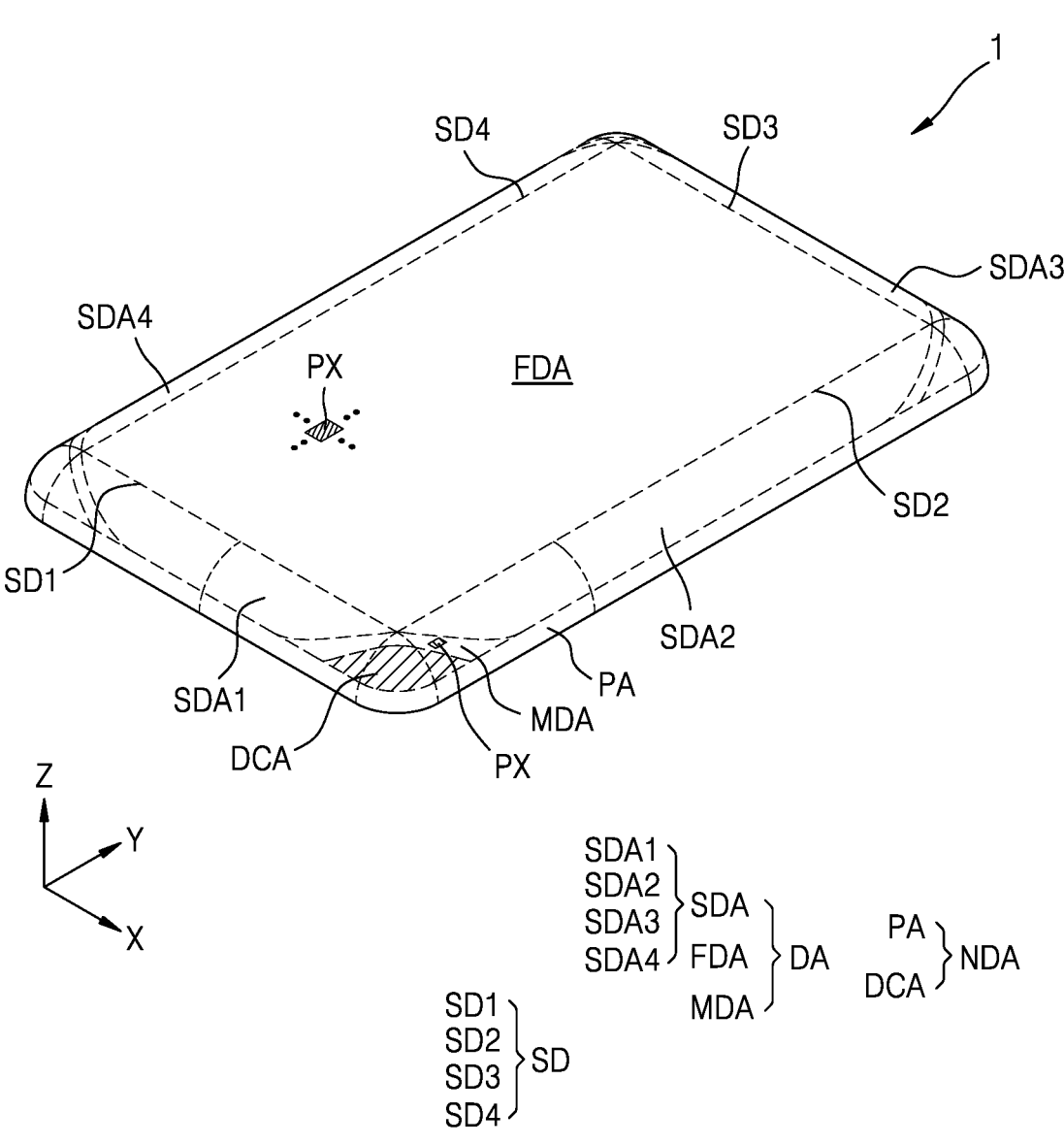
FIGS. 9A and 9B are schematic perspective views of a display apparatus according to an alternative embodiment.
Figure 9B:
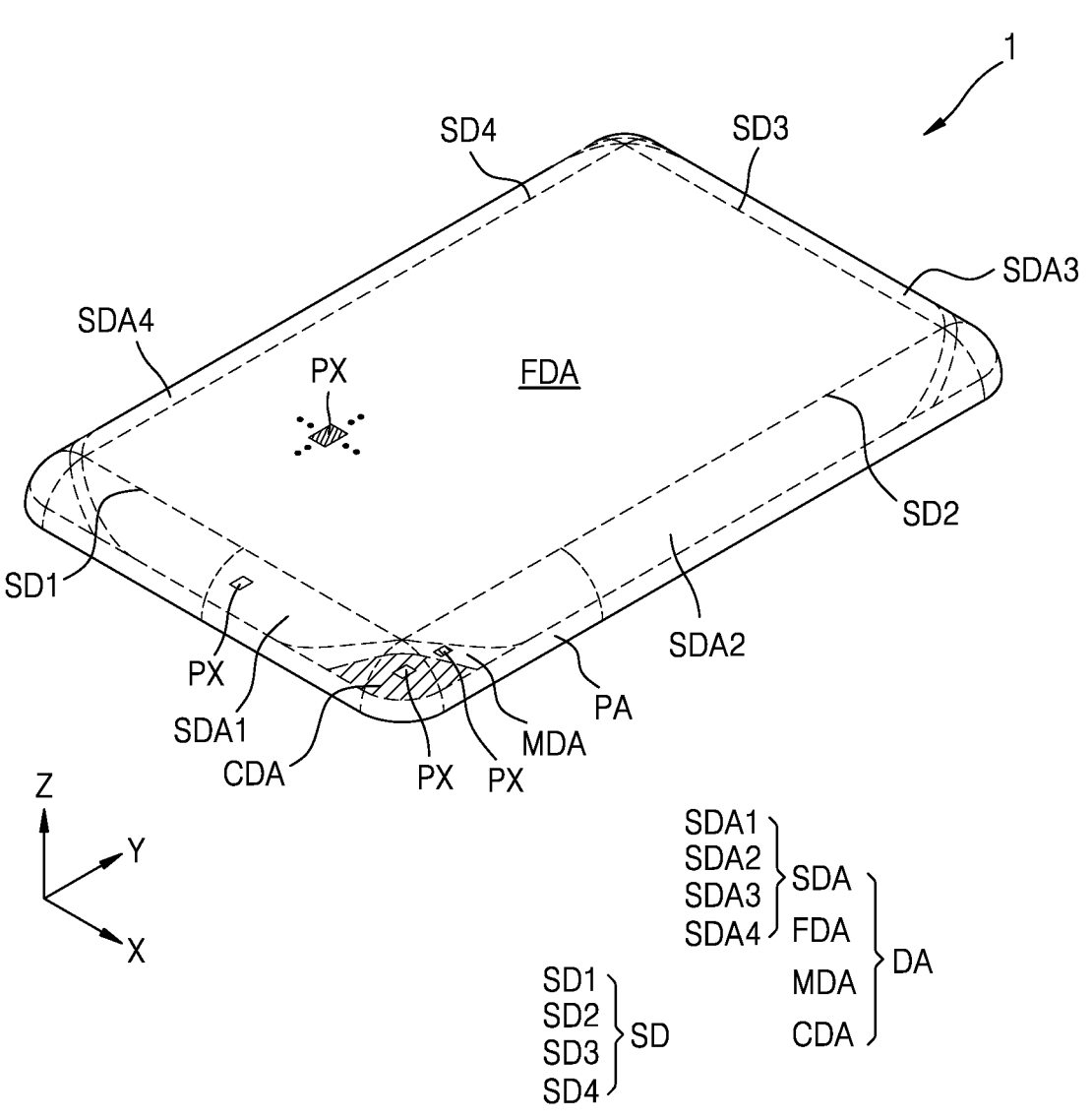
Figure 10:
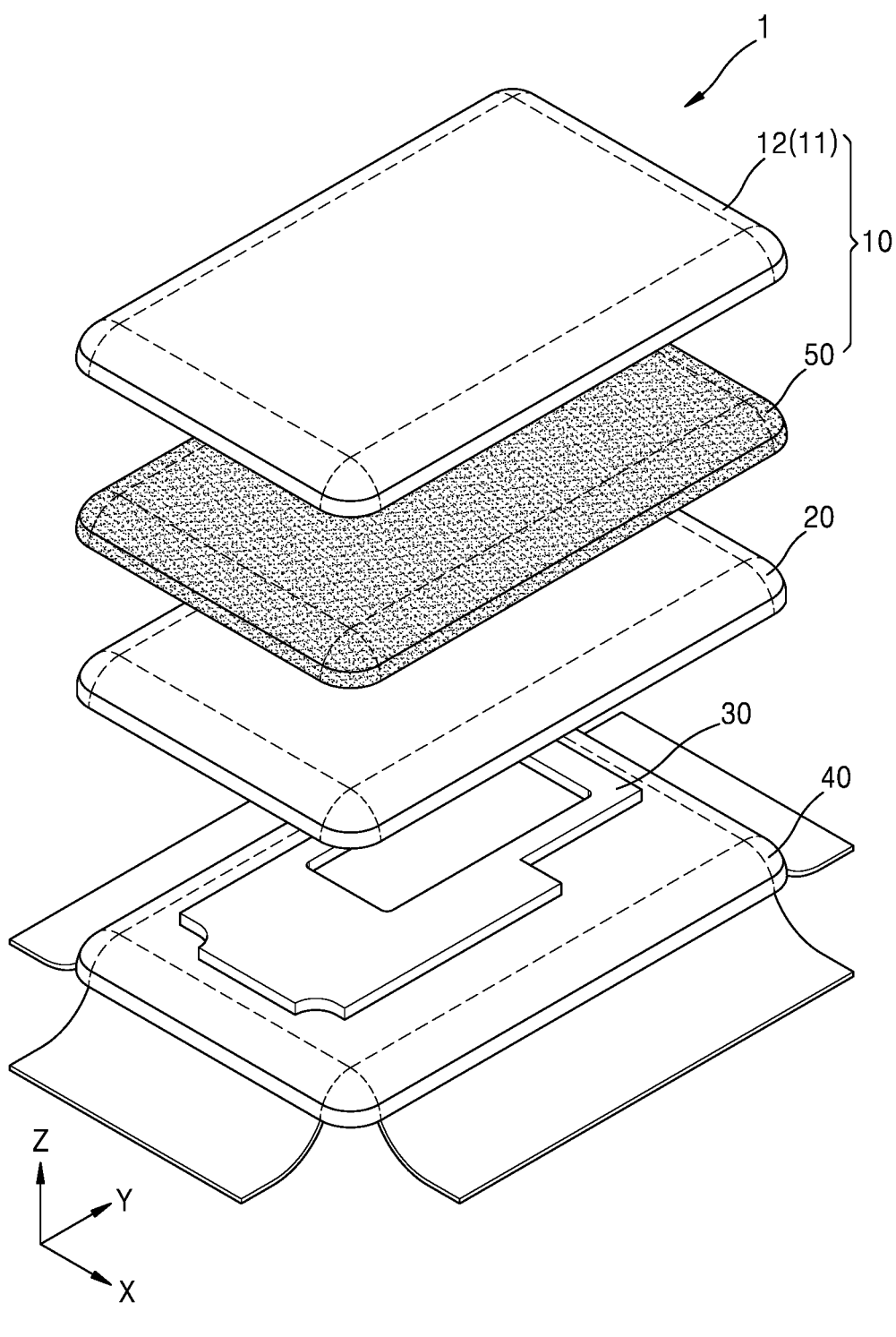
FIG. 10 is a schematic exploded perspective view of the display apparatus of FIG. 9A or 9B.

FIGS. 9A and 9B are schematic perspective views of a display apparatus according to an alternative embodiment. FIG. 10 is a schematic exploded perspective view of the display apparatus of FIG. 9A or 9B.

Referring to FIG. 9A, an embodiment of a display apparatus 1 may be used as the display screens of various products such as not only portable electronic apparatuses, such as mobile phones, smartphones, tablet personal computers (PCs), mobile communication terminals, electronic notebooks, electronic books, portable multimedia players (PMPs), navigation devices, and ultra mobile PCs (UMPCs) but also televisions, notebooks, monitors, advertisement panels, and Internet of things (IoT) devices.

According to an embodiment, the display apparatus 1 may have a quadrangular shape when viewed from a plan view, e.g., a top plan view or a plan view in the Z-axis direction. In an alternative embodiment, the display apparatus 1 may have one of various shapes such as a polygon (such as a triangle or a quadrangle), a circle, and an ellipse. According to an embodiment, where the display apparatus 1 has a polygonal shape in a plan view, a polygonal corner may be rounded. For convenience of description, embodiments in which the display apparatus 1 has a quadrangular shape with rounded corners in a plan view will now be focused on and described.

The display apparatus 1 may have shorter edges each extending in a first direction (for example, the X-axis direction, hereinafter a direction in the X-axis direction will be referred to as an x direction, and a direction opposite to the X-axis direction will be referred to as a −x direction) and longer edges each extending in a second direction (for example, the Y-axis direction, hereinafter a direction in the Y-axis direction will be referred to as a y direction, and a direction opposite to the Y-axis direction will be referred to as a −y direction). According to another embodiment, the length of an edge of the display apparatus 1 in the first direction (for example, the x direction or the −x direction) may be equal to that of an edge of the display apparatus 1 in the second direction (for example, the y direction or the −y direction). According to an alternative embodiment, the display apparatus 1 may have longer edges each extending in the first direction (for example, the x direction or the −x direction) and shorter edges each extending in the second direction (for example, the y direction or the −y direction).

Corners between the shorter sides in the first direction (for example, the x or −x direction) and the longer sides in the second direction (for example, the y or −y direction) may each be rounded to have a certain curvature.

The display apparatus 1 may include a display area DA and a peripheral area NDA located outside the display area DA. The display area DA may include a plurality of pixels PX as a display element arranged therein, and may provide an image through an array of the plurality of pixels PX. The pixels PX may be defined as an area where light is emitted by light-emitting devices included in the display apparatus 1. In an embodiment, for example, each of the plurality of pixels PX may include a red subpixel, a green subpixel, and a blue subpixel. Alternatively, each of the plurality of pixels PX may include red, green, blue, and white subpixels.

According to an embodiment, the display area DA may include a main display area FDA, an auxiliary display area SDA, and a middle display area MDA. A plurality of pixels PX may be arranged in each of the main display area FDA, the auxiliary display area SDA, and the middle display area MDA.

The main display area FDA may include a flat surface. According to an embodiment, a ratio of the main display area FDA to the display area DA of the display apparatus 1 may be the greatest, and thus most images may be provided.

The auxiliary display area SDA may include a curved surface by at least a portion of the auxiliary display area SDA bending, and may extend outwards from each edge SD of the main display area FDA. According to an embodiment, the auxiliary display area SDA may include a first auxiliary display area SDA1, a second auxiliary display area SDA2, a third auxiliary display area SDA3, and a fourth auxiliary display area SDA4. According to some embodiments, at least one selected from the first auxiliary display area SDA1, the second auxiliary display area SDA2, the third auxiliary display area SDA3, and the fourth auxiliary display area SDA4 may be omitted.

According to an embodiment, the first auxiliary display area SDA1 may be adjacent to a first edge SD1 of the main display area FDA and may extend from the first edge SD1 outwards in the −y direction. The second auxiliary display area SDA2 may be adjacent to a second edge SD2 of the main display area FDA, and may extend from the second edge SD2 outwards in the x direction. The third auxiliary display area SDA3 may be adjacent to a third edge SD3 of the main display area FDA, and may extend from the third edge SD3 outwards in the y direction. The fourth auxiliary display area SDA4 may be adjacent to a fourth edge SD4 of the main display area FDA, and may extend from the fourth edge SD4 outwards in the −x direction. In such an embodiment, the first auxiliary display area SDA1 and the third auxiliary display area SDA3 may be located on opposite sides with the main display area FDA therebetween, and the second auxiliary display area SDA2 and the fourth auxiliary display area SDA4 may be located on opposite sides with the main display area FDA therebetween.

As shown in FIG. 9A, the first, second, third, and fourth auxiliary display areas SDA1, SDA2, SDA3, and SDA4 may include bent surfaces respectively having certain curvatures. In an embodiment, for example, the first auxiliary display area SDA1 and the third auxiliary display area SDA3 may have curved surfaces each bent about a bending axis extending in the x direction, and the second auxiliary display area SDA2 and the fourth auxiliary display area SDA4 may have curved surfaces each bent about a bending axis extending in the y direction. The respective curvatures of the first, second, third, and fourth auxiliary display areas SDA1, SDA2, SDA3, and SDA4 may be the same as or different from one another. In an embodiment, for example, the curvature of the first auxiliary display area SDA1 may be the same as that of the third auxiliary display area SDA3, and the curvature of the second auxiliary display area SDA2 may be the same as that of the fourth auxiliary display area SDA4. In an embodiment, for example, the curvature of the first auxiliary display area SDA1 may be different from the curvature of the second auxiliary display area SDA2. In an alternative embodiment, for example, the curvature of the first auxiliary display area SDA1 may be the same as the curvature of the second auxiliary display area SDA2.

The middle display area MDA may be between the main display area FDA and a display apparatus corner area DCA which will be described later. The middle display area MDA may be also located between the auxiliary display area SDA and the display apparatus corner area DCA. The middle display area MDA may extend between the main display area FDA and the display apparatus corner area DCA and between the auxiliary display area SDA and the display apparatus corner area DCA. In an embodiment, as shown in FIG. 9A, where the display apparatus 1 has a quadrangular shape in a plan view, four middle display areas MDA may be included.

According to an embodiment, the middle display area MDA may not only include a plurality of pixels PX, but also a driver or the like for providing an electrical signal or power may be arranged in each display area DA. According to some embodiments, the pixels PX located in the middle display area MDA may be arranged to overlap the driver or the like located in the middle display area MDA. According to some embodiments, at least one of pixel circuit for driving the pixels PX located in the middle display area MDA may be arranged in the main display area FDA, the auxiliary display area SDA, and/or the display apparatus corner area DCA adjacent to the middle display area MDA.

The display apparatus 1 of FIG. 9A may display an image not only in the main display area FDA but also in the auxiliary display area SDA and the middle display area MDA. Accordingly, occupancy of the display area DA in the display apparatus 1 may increase. In such an embodiment, the relative area of the peripheral area NDA in the display apparatus 1 may decrease, and the relative area of the display area DA in the display apparatus 1 may increase.

No pixels PX are arranged in the peripheral area NDA of the display apparatus 1, and thus the peripheral area NDA may be an area that provides no images. The peripheral area NDA may include a peripheral area PA outside the display area DA. The peripheral area PA may entirely or partially surround the display area DA. A driver or the like for providing an electrical signal or power to the display area DA may be arranged in the peripheral area PA.

According to an embodiment, the peripheral area NDA may include the display apparatus corner area DCA. The display apparatus corner area DCA may be located at a corner where two adjacent edges of the main display area FDA meet each other. In an embodiment, for example, the display apparatus corner area DCA may be located at a corner where the first edge SD1 and the second edge SD2 of the main display area FDA meet each other, and the display apparatus corner area DCA may be adjacent to the first auxiliary display area SDA1 and the second auxiliary display area SDA2. In an embodiment, as shown in FIG. 9A, where the display apparatus 1 has a quadrangular shape in a plan view, four display apparatus corner areas DCA may be included.

In such an embodiment, because the display apparatus corner area DCA is located between neighboring auxiliary display areas SDA having curved surfaces bent in different directions, the display apparatus corner area DCA may have a curved surface in which curved surfaces bent in various directions are continuously connected. In such an embodiment where neighboring auxiliary display areas SDA have different curvatures, the curvature of the display apparatus corner area DCA may gradually change along the edge of the display apparatus 1. In an embodiment, for example, where the curvature of the first auxiliary display area SDA1 is different from that of the second auxiliary display area SDA2, the display apparatus corner area DCA between the first auxiliary display area SDA1 and the second auxiliary display area SDA2 may have a curvature that gradually changes according to locations.

Although only the first auxiliary display area SDA1, the second auxiliary display area SDA2, and the display apparatus corner area DCA therebetween are described above, the other three display apparatus corner areas DCA may be substantially the same as the display apparatus corner area DCA between the first auxiliary display area SDA1 and the second auxiliary display area SDA2, and any repetitive detailed description thereof will be omitted.

Referring to FIG. 9B, an alternative embodiment of a display area DA may include a main display area FDA, an auxiliary display area SDA, a middle display area MDA, and a corner display area CDA. A plurality of pixels PX may be arranged in each of The main display area FDA, the auxiliary display area SDA, the middle display area MDA, and the corner display area CDA. In such an embodiment, the main display area FDA and the auxiliary display area SDA are substantially the same as those described above with reference to FIG. 9A, and thus any repetitive detailed description thereof will be omitted here.

The middle display area MDA may be between the main display area FDA and the corner display area CDA, which is to be described later. The middle display area MDA may be also located between the auxiliary display area SDA and the corner display area CDA. The middle display area MDA may extend between the main display area FDA and the corner display area CDA and between the auxiliary display area SDA and the corner display area CDA. In an embodiment, as shown in FIG. 9B, where the display apparatus 1 has a quadrangular shape in a plan view, four middle display areas MDA may be included. According to some embodiments, at least one of pixel circuit (for driving the pixels PX located in the middle display area MDA may be arranged in the main display area FDA, the auxiliary display area SDA, and/or the corner display area CDA adjacent to the middle display area MDA.

The corner display area CDA may be arranged at a corner of the display apparatus 1 and may include a curved surface. The corner of the display apparatus 1 may be a portion where a shorter edge of the display apparatus 1 in the first direction (for example, the x direction or the −x direction) and a longer edge of the display apparatus 1 in the second direction (for example, the y direction or the −y direction) meet each other. In an embodiment, as shown in FIG. 9B, where the display apparatus 1 has a quadrangular shape in a plan view, four corner display areas CDA may be included.

The corner display area CDA may be located at a corner where two edges of the main display area FDA meet each other. In such an embodiment, the corner display area CDA may be adjacent to two auxiliary display areas SDA. In an embodiment, for example, the corner display areas CDA may be located at a corner where the first edge SD1 and the second edge SD2 of the main display area FDA meet each other, and may be adjacent to the first auxiliary display area SDA1 and the second auxiliary display area SDA2.

In such an embodiment, because the corner display area CDA is located between neighboring auxiliary display areas SDA having curved surfaces bent in different directions, the corner display area CDA may have a curved surface in which curved surfaces bent in various directions are continuously connected. In such an embodiment where neighboring auxiliary display areas SDA have different curvatures, the curvature of the corner display area CDA may gradually change along the edge of the display apparatus 1. In an embodiment, for example, where the curvature of the first auxiliary display area SDA1 is different from that of the second auxiliary display area SDA2, the corner display area CDA between the first auxiliary display area SDA1 and the second auxiliary display area SDA2 may have a curvature that gradually changes according to locations.

Although only the first auxiliary display area SDA1, the second auxiliary display area SDA2, and the corner display area CDA therebetween have been described above, the other three corner display areas CDA may be substantially the same as the display apparatus corner area DCA between the first auxiliary display area SDA1 and the second auxiliary display area SDA2, and any repetitive detailed description thereof will be omitted.

The display apparatus 1 of FIG. 9B may display an image not only in the main display area FDA, the auxiliary display area SDA, and the middle display area MDA but also in the corner display area CDA. Accordingly, occupancy of the display area DA in the display apparatus 1 may further increase. In such an embodiment, the relative area of the peripheral area NDA in the display apparatus 1 may decrease, and the relative area of the display area DA in the display apparatus 1 may increase. Because the display apparatus 1 includes the corner display areas CDA having curved surfaces rounded at their corners and displaying an image, aesthetic appeal of the display apparatus 1 may improve.

The peripheral area NDA of the display apparatus 1 of FIG. 9B may include a peripheral area PA outside the display area DA. According to an embodiment, the peripheral region PA may entirely surround the main display area FDA, the four auxiliary display areas SDA, and the four corner display areas CDA.

Referring to FIG. 10, an embodiment of the display apparatus 1 may include a display panel unit (not denoted) including the display panel 50 and the cover window 11, and a protection panel (not denoted) including the cover member 20, the film member 30, and the panel member 40. The cover window 11 may be disposed on a front surface of the display panel 50. The front surface of the display panel 50 may be defined as a surface that faces a direction in which the display panel 50 provides an image.

According to an embodiment, the cover window 11 may be arranged to cover the entire surface of the display panel 50. The cover window 11 may protect the entire surface of the display panel 50. The cover window 11 may form the exterior of the display apparatus 1, and thus may include a flat surface and a curved surface corresponding to the shape of the display apparatus 1.

The cover window 11 may be attached onto the display panel 50 by an adhesive layer (not shown). The adhesive layer may include, for example, an adhesive member, such as an OCA or a PSA.

The cover window 11 may have a high transmittance to transmit light emitted by the display panel 50, and may have a small thickness to minimize a weight of the display apparatus 1. The cover window 11 may also have high strength and hardness to protect the display panel 50 from external impacts. In an embodiment, for example, the cover window 11 may be a flexible window. The cover window 11 may protect the display panel 50 while being easily bent along an external force without generating cracks or the like. As another example, the cover window 11 may include glass, sapphire, or plastic. In an embodiment, for example, the cover window 11 may be ultra-thin tempered glass (ultra-thin glass, UTG®) having a strength enhanced by a method such as chemical strengthening or thermal strengthening. According to an alternative embodiment, the cover window 11 may be colorless polyimide (CPI). According to an embodiment, the cover window 11 may have a structure in which a flexible polymer layer is arranged on one surface of a glass substrate, or may include only a polymer layer.

An image implemented by the display panel 50 may be provided to a user through the cover window 11. Here, an image provided by the display apparatus 1 may be understood as the image implemented by the display panel 50, and thus the display area DA (see FIG. 9A or 9B) and the peripheral area NDA (see FIG. 9A or 9B) of the display apparatus 1 may be understood as those included in the display panel 50.

The protection panel may be arranged on a rear surface of the display panel 50. In an embodiment, the protection panel may be arranged on one surface of the display panel 50 where the cover window 11 is arranged, and another surface of the display panel 50 that is opposite to the one surface.

Although not shown in the drawings, an optical functional layer (not shown) may be arranged between the display panel 50 and the cover window 11. A protection member (not shown) may be disposed on the cover window 11.

In such an embodiment, the cover member 20 may be formed to be curved at both ends and vertices, in the same or similar manner as or to the shape of the cover window 11. Before being attached to the display panel 50, the cover member 20 may be formed to have both curved ends and curved vertices as shown in FIG. 10.

The film member 30 may be arranged in a concave portion of the cover member 20. The film member 30 may be arranged on a flat portion of the cover member 20. In this case, an opening region may be arranged in the film member 30.

The panel member 40 may be arranged in the concave portion of the cover member 20. In an embodiment, the panel member 40 may completely block the film member 30. The panel member 40 may include the cutout portion 40-3 as shown in FIGS. 3A through 4E. When the cutout portion 40-3 attaches the display panel 50 to the protection panel, the cutout portion 40-3 may attach the display panel 50 and the protection panel to each other so that the display panel 50 and the protection panel are attached as closely as possible, and may prevent insertion of bubbles between the display panel 50 and the protection panel.

Protection panels according to embodiments may be attached to members having surfaces in various shapes. Display apparatuses according to embodiments may maintain the shape of a display panel to be flat.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A protection panel comprising:
a first panel member comprising a first panel member body portion, and a first adhesive portion on the first panel member body portion;
a film member on the first panel member; and
a cover member disposed above a surface of the film member,
wherein a portion of at least one selected from the first panel member body portion and the first adhesive portion of the first panel member includes a cutout portion which allows adjacent portions thereto to be separated from each other, and
wherein the cover member comprises:
a cover layer comprising metal;
a cushion layer on the cover layer; and
an uneven layer on the cushion layer.

2. The protection panel of claim 1, wherein
the cutout portion is provided in plurality, and
the plurality of cutout portions are arranged apart from each other.

3. The protection panel of claim 2, further comprising:
a bridge portion disposed between adjacent cutout portions from among the plurality of cutout portions, wherein the bridge portion connects a first region and a second region of the first panel member which are adjacent to each other with the adjacent cutout portions therebetween.

4. The protection panel of claim 1, further comprising:
a second panel member comprising a second adhesive portion on the first panel member body portion, and a second panel member body portion on the second adhesive portion.

5. A protection panel comprising:
a first panel member comprising a first panel member body portion, and a first adhesive portion on the first panel member body portion;
a film member on the first panel member; and
a cover member disposed on the first adhesive portion, wherein
a portion of at least one selected from the first panel member body portion and the first adhesive portion of the first panel member includes a cutout portion which allows adjacent portions thereto to be separated from each other,
the protection panel further comprises a second panel member comprising a second adhesive portion on the first panel member body portion, and a second panel member body portion on the second adhesive portion, and
the cutout portion is defined in the second adhesive portion.

6. The protection panel of claim 5, wherein the cutout portion is defined in a portion of the second panel member body portion.

7. The protection panel of claim 4, wherein an adhesive force of the second adhesive portion is greater than an adhesive force of the first adhesive portion.

8. The protection panel of claim 4, wherein an adhesive force of the second adhesive portion is 50 times or more an adhesive force of the first adhesive portion.

9. A display apparatus comprising:
a first panel member comprising a first panel member body portion, and a first adhesive portion on the first panel member body portion;
a film member on the first panel member;
a cover member above a surface of the film member; and
a display panel on the cover member,
wherein a portion of at least one selected from the first panel member body portion and the first adhesive portion of the first panel member includes a cutout portion which allows adjacent portions thereto to be separated from each other, and
wherein the cover member comprises:
a cover layer comprising metal;
a cushion layer on the cover layer; and
an uneven layer on the cushion layer.

10. The display apparatus of claim 9, wherein
the cutout portion is provided in plurality, and
the plurality of cutout portions are arranged apart from each other.

11. The display apparatus of claim 10, further comprising:
a bridge portion between adjacent cutout portions from among the plurality of cutout portions,
wherein the bridge portion connects a first region and a second region of the first panel member which are adjacent to each other with the adjacent cutout portions therebetween.

12. The display apparatus of claim 10, wherein areas of at least one selected from the first adhesive portion and the first panel member body portion which are adjacent to each other with the cutout portion therebetween are connected to each other to form a step structure.

13. The display apparatus of claim 9, further comprising:

a second panel member comprising a second adhesive portion on the first panel member body portion, and a second panel member body portion on the second adhesive portion.

14. The display apparatus of claim 13, wherein the cutout portion is defined in the second panel member body portion.

15. The display apparatus of claim 13, wherein an adhesive force of the second adhesive portion is greater than an adhesive force of the first adhesive portion.

16. The display apparatus of claim 13, wherein an adhesive force of the second adhesive portion is 50 times or more an adhesive force of the first adhesive portion.

17. The display apparatus of claim 9, wherein areas of the first adhesive portion which are adjacent to each other with the cutout portion therebetween contact the cover member.

18. A display apparatus comprising:

a first panel member comprising a first panel member body portion, and a first adhesive portion on the first panel member body portion;

a film member on the first panel member;

a cover member on the first adhesive portion; and a display panel on the cover member, wherein a portion of at least one selected from the first panel member body portion and the first adhesive portion of the first panel member includes a cutout portion which allows adjacent portions thereto to be separated from each other, the display apparatus further comprises a second panel member comprising a second adhesive portion on the first panel member body portion, and a second panel member body portion on the second adhesive portion, and the cutout portion is defined in the second adhesive portion.

19. A display apparatus comprising:

a first panel member comprising a first panel member body portion, and a first adhesive portion on the first panel member body portion;

a film member on the first panel member;

a cover member on the first adhesive portion; and a display panel on the cover member, wherein a portion of at least one selected from the first panel member body portion and the first adhesive portion of the first panel member includes a cutout portion which allows adjacent portions thereto to be separated from each other, the display apparatus further comprises a second panel member comprising a second adhesive portion on the first panel member body portion, and a second panel member body portion on the second adhesive portion, and areas of at least one selected from the first panel member and the second panel member which are adjacent to each other with the cutout portion therebetween are connected to each other to form a step structure.

* * * * *